US012794685B2

(12) United States Patent
Tokuyama

(10) Patent No.: US 12,794,685 B2
(45) Date of Patent: Nov. 10, 2026

(54) AUTHENTICATION APPARATUS, AUTHENTICATION METHOD, AUTHENTICATION SYSTEM, AND RECORDING MEDIUM

(71) Applicant: Masaaki Tokuyama, Tokyo (JP)

(72) Inventor: Masaaki Tokuyama, Tokyo (JP)

(*) Notice: Subject to any disclaimer, the term of this patent is extended or adjusted under 35 U.S.C. 154(b) by 167 days.

(21) Appl. No.: 18/694,873

(22) PCT Filed: Jul. 29, 2022

(86) PCT No.: PCT/JP2022/029272
§ 371 (c)(1),
(2) Date: Mar. 22, 2024

(87) PCT Pub. No.: WO2023/047800
PCT Pub. Date: Mar. 30, 2023

(65) Prior Publication Data
US 2024/0405979 A1 Dec. 5, 2024

(30) Foreign Application Priority Data
Sep. 27, 2021 (JP) ................................ 2021-156740

(51) Int. Cl.
*H04L 9/08* (2006.01)
*H04L 9/32* (2006.01)

(52) U.S. Cl.
CPC .......... *H04L 9/0861* (2013.01); *H04L 9/0825* (2013.01); *H04L 9/3231* (2013.01)

(58) Field of Classification Search
CPC ... H04L 9/0861; H04L 9/0825; H04L 9/3231; H04L 9/164; H04L 9/16; H04L 9/32; G06F 21/32
See application file for complete search history.

(56) References Cited

U.S. PATENT DOCUMENTS 8,627,095 B2 1/2014 Asano
8,816,818 B2 8/2014 Yamada et al.
(Continued)

FOREIGN PATENT DOCUMENTS

JP 2011-155348 A 8/2011
JP 2018-510593 A 4/2018
(Continued)

OTHER PUBLICATIONS

Final Office Action on U.S. Appl. No. 18/041,976 DTD Jan. 18, 2024.
(Continued)

*Primary Examiner* — Techane Gergiso
(74) *Attorney, Agent, or Firm* — Foley & Lardner LLP

(57) ABSTRACT

An authentication apparatus (1) generates, when a first condition is satisfied, a biometric key from biometric information of a user by means of a predetermined one-way function. The authentication apparatus (1) acquires an information processing device public key from an information processing device (7), generates an authentication apparatus secret key and an authentication apparatus public key based on the biometric key and random information, and generates a common key based on the authentication apparatus secret key and the information processing device public key, and thereby generate, based on the random information and the common key, identification information for verifying validity of the user. The authentication apparatus (1) instructs the information processing device (7) to verify validity of the user using the identification information, and updates the identification information when a second condition that is different from the first condition is satisfied.

8 Claims, 20 Drawing Sheets

(56) References Cited

U.S. PATENT DOCUMENTS 8,843,760 B2 * 9/2014 Atherton ............... H04L 9/3231 713/186
10,434,419 B2 10/2019 Tsuchiya et al.
10,868,672 B1 12/2020 Farrugia et al.
11,405,387 B1 * 8/2022 Griffin .................. H04L 9/0866
11,757,662 B2 9/2023 Le Saint et al.
2002/0095588 A1 * 7/2002 Shigematsu ........... G07C 9/257 705/65
2004/0005051 A1 * 1/2004 Wheeler ............... H04L 9/3231 380/28
2006/0048212 A1 3/2006 Tsuruoka et al.
2011/0142234 A1 * 6/2011 Rogers .................. G07F 7/1075 380/247
2013/0080788 A1 * 3/2013 Bacchiaz .................. H04L 9/40 713/186
2014/0115324 A1 * 4/2014 Buer ....................... H04L 9/085 713/155
2016/0294555 A1 10/2016 Jakobsson et al.
2017/0078091 A1 3/2017 Fiske
2017/0141924 A1 * 5/2017 Ryu ....................... H04L 9/3236
2018/0097806 A1 * 4/2018 Blinn .................. H04L 63/0861
2018/0137265 A1 5/2018 Tokuyama
2018/0212782 A1 * 7/2018 Csik ........................ G06F 21/64
2019/0042716 A1 * 2/2019 Kaga ..................... H04L 9/3231
2019/0116044 A1 * 4/2019 Matsumoto ............. H04L 9/321
2021/0182863 A1 * 6/2021 Doraiswamy ...... G06Q 20/0855
2021/0234858 A1 * 7/2021 Nakagawa .......... H04L 63/0838
2021/0342433 A1 11/2021 Fujita et al.
2023/0205857 A1 6/2023 Kimiaki et al.
2023/0396440 A1 12/2023 Tokuyama

FOREIGN PATENT DOCUMENTS

JP 2020-113107 A 7/2020
JP 6869450 B 5/2021
JP 6946592 B 10/2021
WO WO-2016/175333 A1 11/2016

OTHER PUBLICATIONS

Non-Final Office Action on U.S. Appl. No. 18/041,976 DTD Oct. 3, 2023.

International Search Report and Written Opinion issued in connection with PCT/JP2022/029272 dated Sep. 27, 2022.

International Search Report issued in connection with PCT/JP2021/042059 dated Feb. 15, 2022.

Shibata, Yoichi. "A challenge-response authentication with a password extracted from a fingerprint", IEICE Technical Report, Jul. 13, 2004, pp. 179-186.

Shibata, Yoichi. "Mechanism-based PKI-A Real-time Key Generation from Fingerprints", IPSJ Journal, Aug. 15, 2004, pp. 1833-1844.

* cited by examiner

AUTHENTICATION BIOMETRIC INFORMATION DB 171

| BIOMETRIC INFORMATION TYPE | REGISTERED INFORMATION | MEAN VALUE OF AUTHENTICATION VALUES | ALLOWABLE AUTHENTICATION VALUE | AUTHENTICATION THRESHOLD VALUE |
|---|---|---|---|---|
| FACE | AAA | 0.44 | 0.48 | 0.40 |
| VOICE |  | 0.32 | 0.38 | 0.27 |
| IRIS | ●○◎△ | 0.49 | 0.55 | 0.42 |
| FINGERPRINT | ×○×× | 0.39 | 0.41 | 0.30 |
| ... | ... | ... | ... | ... |

FIG.6B

AUTHENTICATION BEHAVIOR INFORMATION DB 172

| BEHAVIOR TYPE | ACQUIRED INFORMATION | LATEST STATUS | ACCEPTANCE CONDITION |
|---|---|---|---|
| COMMUNICATION CONNECTION | ABC_WLAN | 31 TIMES | CONNECTION COUNT EQUAL TO OR GREATER THAN 100 |
| COMMUNICATION CONNECTION | 123WLAN | 157 TIMES | CONNECTION COUNT EQUAL TO OR GREATER THAN 100 |
| EVENT EXECUTION | ○×PARK | 113 m | DISTANCE WITHIN 100 m |
| EVENT EXECUTION | △●MOVIE THEATER | 72 m | DISTANCE WITHIN 100 m |
| DISTANCE BETWEEN FACE AND TERMINAL DEVICE | — | 262 mm | WITHIN DISTANCE PLUS OR MINUS 20 mm |
| DEVICE CONNECTION | DEFGH | BEING CONNECTED | BEING CONNECTED |
| ... | ... | ... | ... |

FIG.6C

INCLINATION INFORMATION TABLE 173

| ANGLE | ACQUISITION DATE AND TIME | STANDBY TIME |
|---|---|---|
| 127 DEGREES | 2019/07/12 11:25:32 | 0.5Sec |

FIG.10

ASSOCIATED INFORMATION LIST771

| PUBLIC KEY OF AUTHENTICATION APPARATUS | IDENTIFICATION INFORMATION |
|---|---|
| ABCD123 | XXXXXXXX |
| OPQR543 | XXXXXXUZ |
| ... | ... |

AUTHENTICATION APPARATUS, AUTHENTICATION METHOD, AUTHENTICATION SYSTEM, AND RECORDING MEDIUM

TECHNICAL FIELD

The present disclosure relates to an authentication apparatus, an authentication method, an authentication system, and a program.

BACKGROUND ART

When a user uses various services online, user authentication for determining whether the user using the service is a valid user is performed in order to prevent unauthorized use. For example, Patent Literature 1 discloses a technology allowing a user to use a service when user authentication is performed by using an authentication method varying for each provided service, such as a facial image, a voiceprint, or a movement of the mouth when a specific word is spoken, and the user is authenticated to be the user himself or herself.

CITATION LIST

Patent Literature

Patent Literature 1: Unexamined Japanese Patent Application Publication No. 2020-113107

SUMMARY OF INVENTION

Technical Problem

However, since user authentication is performed by using an authentication method varying for each service, a user needs to preregister information required for authentication in a plurality of authentication systems. Therefore, there is a problem that a workload of a user in authentication is heavy. Further, the technology disclosed in Patent Literature 1 authenticates a user by a movement of the mouth when a specific word is spoken. However, there is a problem that a user cannot receive a service when the user forgets a keyword associated with the service.

The present disclosure solves the aforementioned problems, and an objective of the present disclosure is to provide an authentication apparatus, an authentication method, an authentication system, and a program that lighten a workload when a user receives a service and enable the user to stably receive the service.

Solution to Problem

In order to achieve the aforementioned objective, an authentication apparatus according to the present disclosure includes:

- biometric key generation means for, when a first condition is satisfied, generating a biometric key from biometric information of a user by means of a predetermined one-way function;
- public key acquisition means for acquiring an information processing device public key from an information processing device;
- pair key generation means for generating a pair key based on the biometric key and random information that is randomly generated information, the pair key including an authentication apparatus secret key and an authentication apparatus public key;
- common key generation means for generating a common key based on the authentication apparatus secret key generated by the pair key generation means and the information processing device public key acquired by the public key acquisition means;
- identification information generation means for generating, based on the random information and the common key generated by the common key generation means, identification information for verifying validity of the user;
- determination instruction means for transmitting, to the information processing device, the identification information generated by the identification information generation means and the authentication apparatus public key generated by the pair key generation means and instructing the information processing device to verify validity of the user based on the identification information and the authentication apparatus public key; and
- updating means for, when a second condition that is different from the first condition is satisfied, updating contents of the identification information in such a way as to be different from contents of the identification information generated by the identification information generation means.

Advantageous Effects of Invention

An authentication system according to the present disclosure provides a service by a user being identified by identification information generated by an authentication apparatus and therefore lightens a workload when a user receives a service and enables the user to stably receive the service.

BRIEF DESCRIPTION OF DRAWINGS

FIG. 6B is a diagram illustrating a table in an authentication behavior information database for storing behavior information acquired by the authentication apparatus illustrated in FIG. 1;

FIG. 6C is a diagram illustrating an inclination information table in the authentication apparatus illustrated in FIG. 1;

FIG. 10 is a diagram illustrating an example of an associated information list stored in the information processing device illustrated in FIG. 1;

DESCRIPTION OF EMBODIMENTS

An authentication system, an authentication apparatus, an authentication method, and a program according to an embodiment of the present disclosure are described in detail below with reference to drawings. Note that identical or equivalent parts are given the identical sign in the diagrams.

Figure 1:
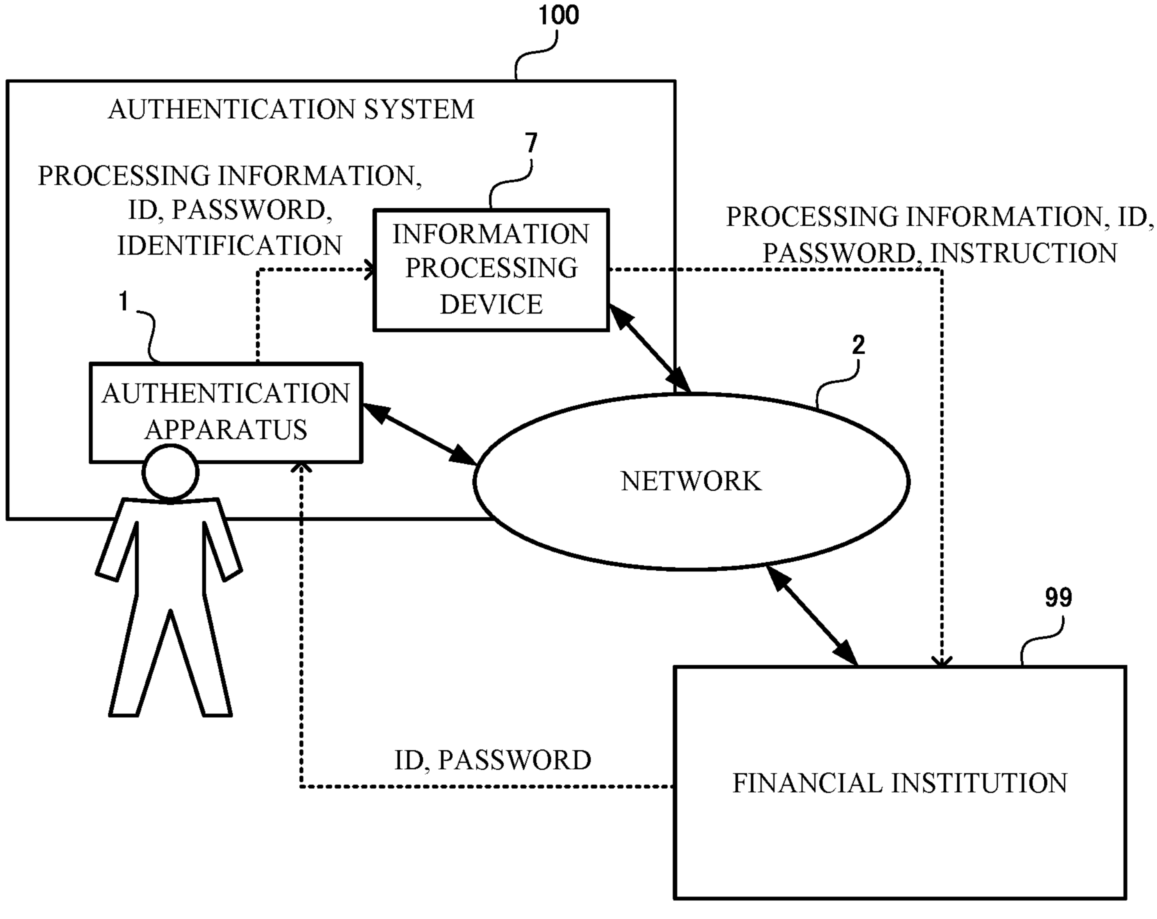
FIG. 1 is a diagram illustrating a configuration of an authentication system according to an embodiment of the present disclosure.

FIG. 1 is a diagram illustrating a configuration of an authentication system 100. As illustrated in FIG. 1, the authentication system 100 includes an authentication apparatus 1 and an information processing device 7; and the authentication apparatus 1 performs authentication of a user and, when the authentication is successful, generates identification information for determining that the user is valid. As illustrated, in the present embodiment, the authentication apparatus 1 and the information processing device 7 can be individually connected to a financial institution 99 (more specifically, a terminal of the financial institution 99) through a network 2. Then, the information processing device 7 determines validity of a target user by using the identification information and provides a service targeted for the user. A case of providing a financing service to a user who has been recognized as valid is described below as an example in the present embodiment.

The authentication apparatus 1 is a so-called smartphone or a tablet terminal, and the information processing device 7 is a personal computer, a smartphone, or a tablet terminal, according to the present embodiment. Further, for ease of understanding, a case in which a transfer is performed as a financing service at a so-called internet banking is described below as an example. For example, the authentication apparatus 1 and the information processing device 7 are communicably connected to each other by a wireless local area network (LAN), Wi-Fi (registered trademark), or Bluetooth (registered trademark).

Figure 2:
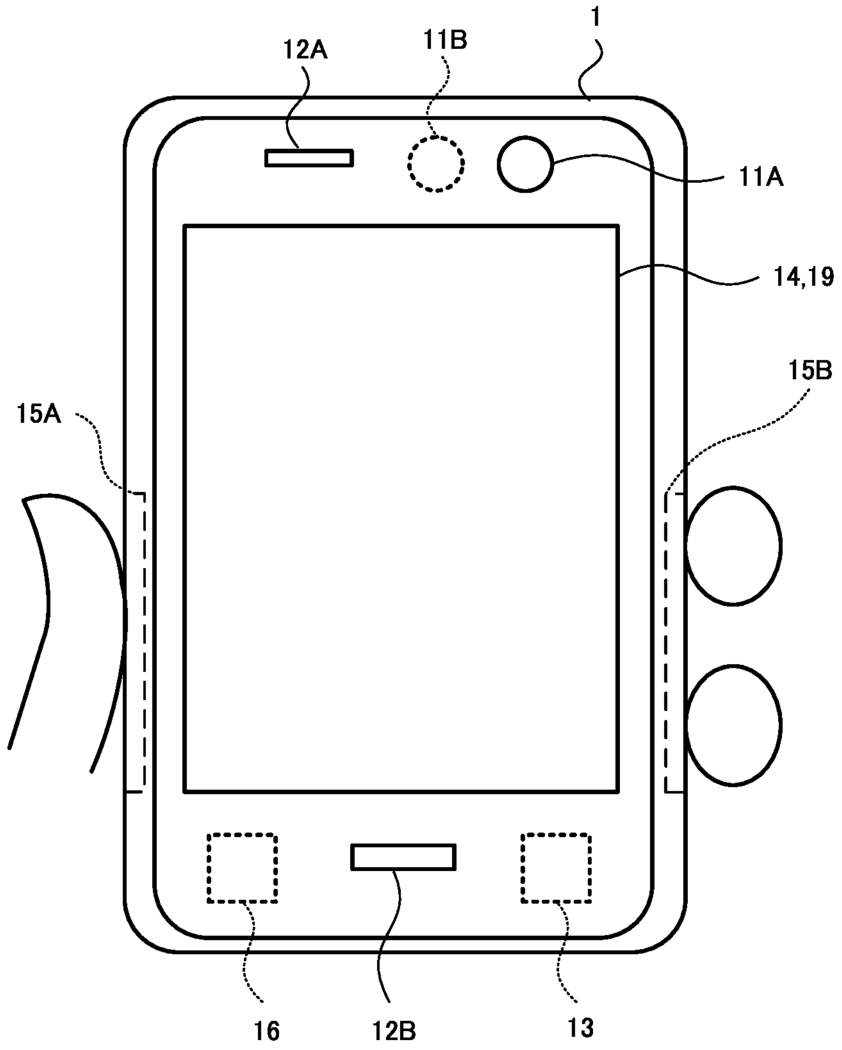
FIG. 2 is a front view of an authentication apparatus illustrated in FIG. 1.

FIG. 2 is a front view of the authentication apparatus 1. The illustrated authentication apparatus 1 is a so-called smartphone. The authentication apparatus 1 includes, on the front side, a front-facing camera 11A capturing an image of a face of a user, a speaker 12A, a microphone 12B being a microphone for telephone conversation, an inclination detector 13 detecting the inclination of the authentication apparatus 1, a touch panel serving as both an operation input device 14 and a display 19, a left fingerprint sensor 15A and a right fingerprint sensor 15B detecting fingerprints of a user, and a position detector 16 detecting the current position of the authentication apparatus 1. Further, the authentication apparatus 1 includes a main camera 11B that can capture images of a person, a scene, an object, and the like viewed from a user on the rear side.

The front-facing camera 11A and the main camera 11B are hereinafter collectively referred to as an image capture device 11. The speaker 12A and the microphone 12B being a microphone for telephone conversation are hereinafter collectively referred to as a voice input-output device 12. Further, the left fingerprint sensor 15A and the right fingerprint sensor 15B are hereinafter collectively referred to as a fingerprint detector 15.

Figure 3:
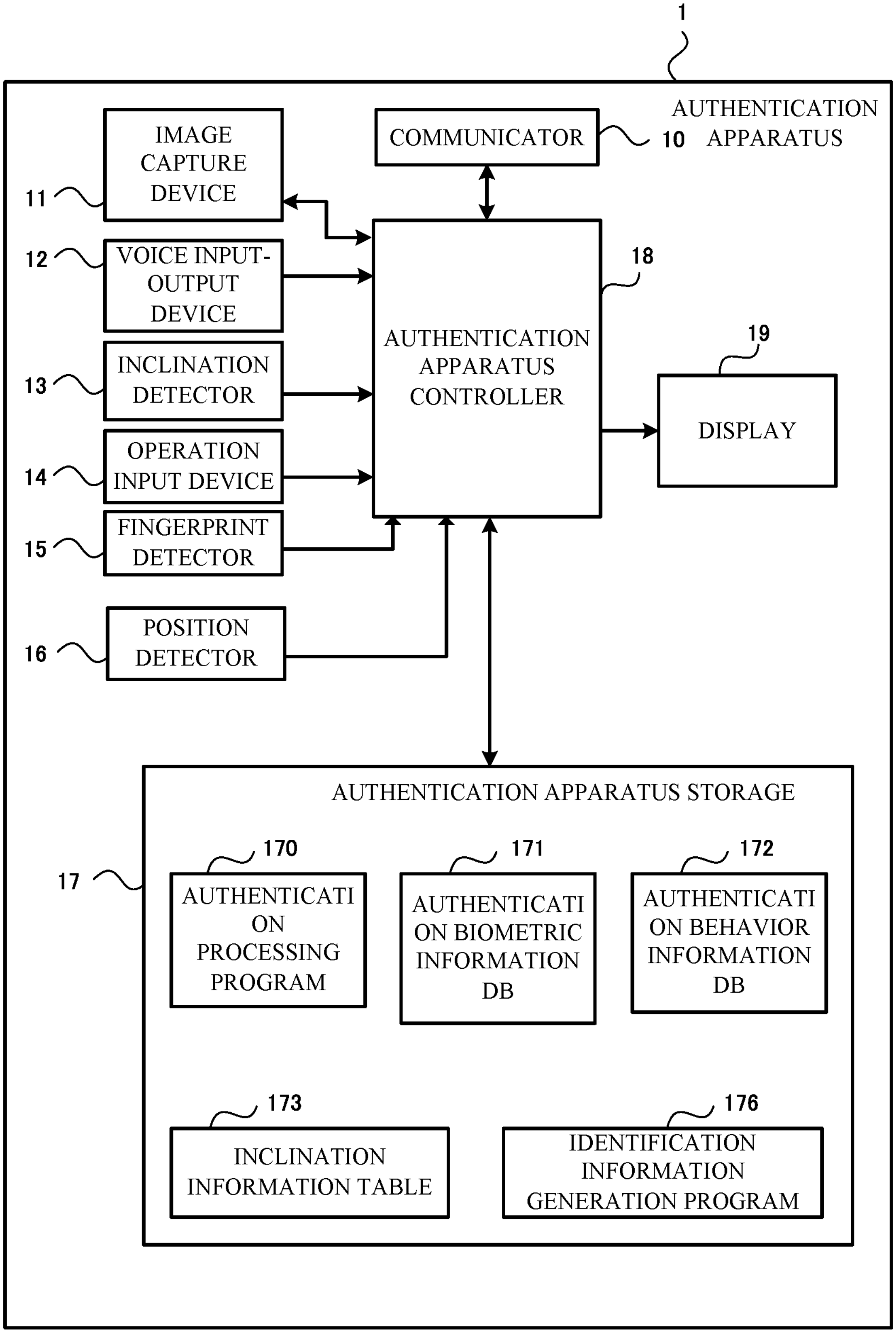
FIG. 3 is a block diagram of the authentication apparatus illustrated in FIG. 1.

FIG. 3 is a block diagram illustrating a configuration of the authentication apparatus 1. The authentication apparatus 1 includes a communicator 10, the image capture device 11, the voice input-output device 12, the inclination detector 13, the operation input device 14, the fingerprint detector 15, the position detector 16, an authentication apparatus storage 17, an authentication apparatus controller 18, and the display 19.

The communicator 10 includes a data communicator communicating with and transmitting and receiving various types of data to and from an external server, a cloud, the information processing device 7, and the like through an unillustrated communication network, and a voice communicator transmitting and receiving wireless signals for telephone communication to and from an unillustrated base station. The data communicator may be configured by using a wireless local area network (LAN), Wi-Fi (registered trademark), Bluetooth (registered trademark) or the like. Further, the voice communicator may be configured by using communication equipment transmitting and receiving wireless signals for telephone communication to and from a base station.

The image capture device 11 includes the front-facing camera 11A and the main camera 11B illustrated in FIG. 2. Various cameras capturing a static image or a dynamic image and allowing the captured static image or dynamic image to be acquired, such as a camera using an imaging element such as a charge coupled device (CCD) or a complementary metal oxide semiconductor (CMOS) image sensor, and a video camera, may be used in the image capture device 11.

The voice input-output device 12 includes the speaker 12A and the microphone 12B illustrated in FIG. 2. The speaker 12A outputs a voice received in a telephone conversation, music data externally acquired through a communication network, and the like. The microphone 12B is a device picking up a user voice.

The inclination detector 13 is a device that can detect the inclination, shaking, and the like of the authentication apparatus 1. The inclination detector 13 may be configured by using various sensors that can detect the inclination of the authentication apparatus 1, such as an acceleration sensor, an angle sensor, and a magnetic sensor detecting geomagnetism. The number of and the number of types of sensors constituting the inclination detector 13 may be one or more than one.

The operation input device 14 is a device that can input an operation by a user illustrated in FIG. 2. The fingerprint detector 15 is a sensor detecting fingerprints of a user. The fingerprint detector 15 includes the left fingerprint sensor 15A and the right fingerprint sensor 15B illustrated in FIG. 2. Without being limited to a fingerprint sensor, any type of sensor, equipment, or the like that can detect fingerprints of a user may be used as the fingerprint detector 15.

The position detector 16 is a device that can detect the current position of the authentication apparatus 1. The position detector 16 may be configured by using equipment that can detect the current position of the authentication apparatus 1, such as the Global Positioning System (GPS).

The authentication apparatus storage 17 includes an authentication processing program 170 for performing user authentication processing, an authentication biometric information database 171 in which biometric information of a user acquired by the authentication apparatus 1 is gathered, an authentication behavior information database 172 in which behavior information of a user acquired by the authentication apparatus 1 is gathered, an inclination information table 173 for storing an inclination state of the authentication apparatus 1, and an identification information generation program 176 for generating identification information for determining that a target user for whom a service is provided is valid. Further, the authentication apparatus storage 17 stores various application programs executed by the authentication apparatus 1. The authentication processing program 170 is a program performing processing of authenticating a user, based on biometric information and behavior information of the user acquired by the authentication apparatus 1. The authentication biometric information database 171 is a database for retaining information about biometric information of a user and an authentication value used for authentication.

The authentication behavior information database 172 is a database for retaining information about a user-specific behavior when operating the authentication apparatus 1, an acceptance condition of authentication, and the like. The user-specific behavior refers to a behavior unique to a user such as an action taken by the user when the user operates the authentication apparatus 1, the distance between a screen on the display 19 and the face of the user, a keystroke, the way the authentication apparatus 1 is held, the position in which the authentication apparatus 1 is used, a connection count to a specific communication network, or starting and operation of a specific application.

The inclination information table 173 is a table for storing the angle of inclination of the authentication apparatus 1 detected by the inclination detector 13, an acquisition date and time, and a standby time for acquisition. The identification information generation program 176 is a program for generating identification information for determining that a target user for whom a service is provided is valid.

Details of the authentication processing program 170, the authentication biometric information database 171, the authentication behavior information database 172, the inclination information table 173, and the identification information generation program 176 are described later.

The authentication apparatus controller 18 executes various programs stored in the authentication apparatus storage 17. Further, the authentication apparatus controller 18 acquires various types of data from the communicator 10, the image capture device 11, the voice input-output device 12, the inclination detector 13, the operation input device 14, the fingerprint detector 15, and the position detector 16, processes the data, and stores the processed data into various databases and tables in the authentication apparatus storage 17. Further, by transmitting an instruction to capture an image to the image capture device 11, the authentication apparatus controller 18 can cause the image capture device 11 to capture an image at any timing.

The display 19 displays processing results of various programs executed by the authentication apparatus controller 18. Further, the display 19 can also display images captured by the image capture device 11, such as a static image and a dynamic image, data input from the operation input device 14, and the like. The display 19 is superposed on the operation input device 14 and constitutes the touch panel illustrated in FIG. 2.

Figure 4:
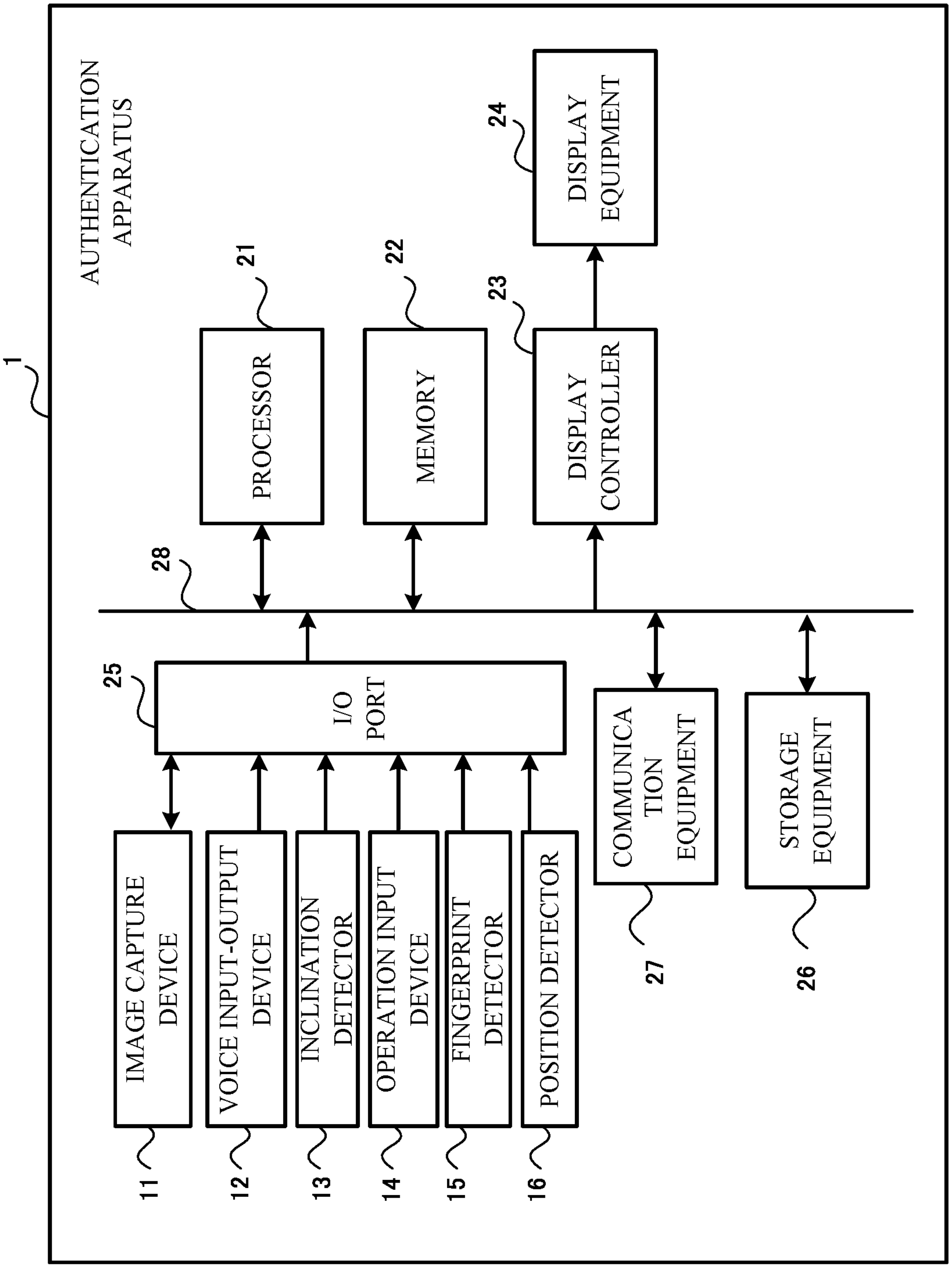
FIG. 4 is a diagram illustrating an example of a hardware configuration of the authentication apparatus illustrated in FIG. 1.

Next, an example of a hardware configuration of the authentication apparatus 1 is described referring to FIG. 4. The authentication apparatus 1 includes a processor 21 executing various programs, a memory 22 for loading various programs, a display controller 23 outputting various types of display data, display equipment 24 displaying various types of display data, an I/O port 25 for connecting the image capture device 11, the voice input-output device 12, and the like, storage equipment 26 storing various programs and various types of data, and communication equipment 27 communicating with the outside and transmitting and receiving various types of data. The processor 21, the memory 22, the display controller 23, the display equipment 24, the I/O port 25, the storage equipment 26, and the communication equipment 27 are interconnected through a data bus 28.

The processor 21 reads various programs stored in the storage equipment 26, loads the programs into the memory 22, and executes the programs. The processor 21 may be configured by using a processing unit such as a central processing unit (CPU) or a micro-processing unit (MPU). Further, the memory 22 may be configured by using a storage element such as a volatile or nonvolatile semiconductor memory such as a random access memory (RAM) or a flash memory, and a storage medium.

The display controller 23 is a controller outputting various types of display data to the display equipment 24. The display controller 23 may be configured by using an image signal output device such as a video card, a graphics processing unit (GPU), or a graphics board. Further, the display equipment 24 may be configured by using a display device such as a liquid crystal display (LCD) or an organic electroluminescence (EL) monitor.

The I/O port 25 is a connection port connectable to the image capture device 11, the voice input-output device 12, the inclination detector 13, the operation input device 14, the fingerprint detector 15, and the position detector 16. The I/O port 25 may be configured by using various ports connectable to equipment, such as a universal serial bus (USB) port and an IEEE 1394 port.

The storage equipment 26 is equipment storing various programs executed by the processor 21 and various types of data for use in various programs. The storage equipment 26 may be configured by using a storage device such as a hard disk drive (HDD) or a solid state drive (SSD).

The communication equipment 27 includes a data communicator communicating with and transmitting and receiving various types of data to and from the information processing device 7 illustrated in FIG. 1, and a voice communicator transmitting and receiving wireless signals for telephone communication to and from an unillustrated base station. The data communicator may be configured by using a wireless LAN, Wi-Fi (registered trademark), Bluetooth (registered trademark), or the like. Further, the voice communicator may be configured by using communication equipment transmitting and receiving wireless signals for telephone communication to and from a base station.

Figure 5:
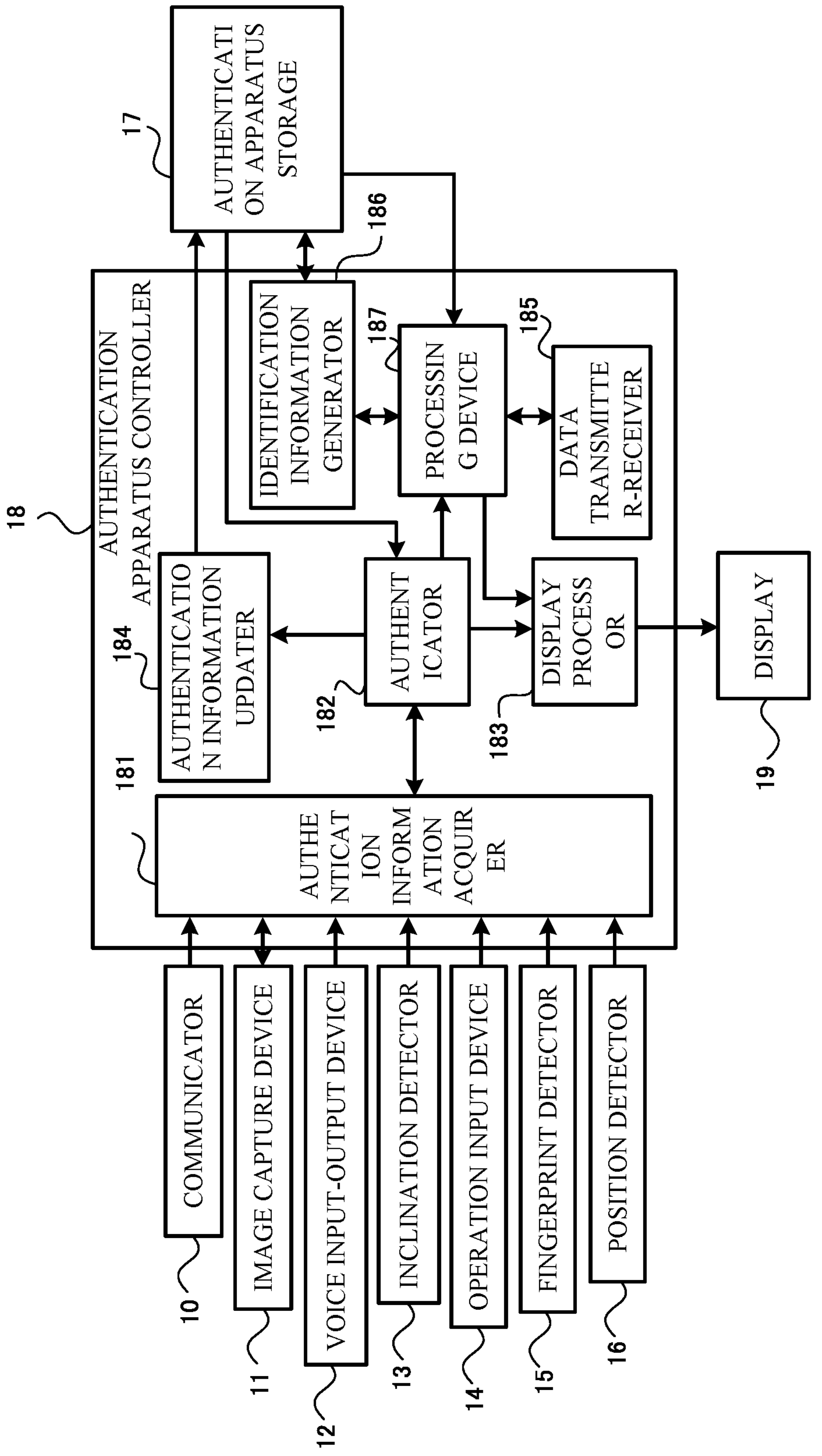
FIG. 5 is a diagram illustrating an information processing block in the authentication apparatus illustrated in FIG. 1.

By executing the authentication processing program 170 and the identification information generation program 176 stored in the authentication apparatus storage 17 in the authentication apparatus 1 illustrated in FIG. 3 by the aforementioned processor 21, an information processing block (each functional component) illustrated in FIG. 5 is implemented in the authentication apparatus controller 18. Thus, the authentication apparatus 1 can authenticate a user to be the user himself or herself, based on biometric information such as an image of the face, a fingerprint, and a voiceprint of the user himself or herself, and behavior information such as a specific action taken by the user when the user operates the authentication apparatus 1 and an operation state and can execute various types of processing in the authentication apparatus 1.

The information processing block implemented by the processor 21 includes an authentication information acquirer 181 acquiring biometric information and behavior information for authentication from the communicator 10, the image capture device 11, and the like, an authenticator 182 authenticating whether a user is the user himself or herself, a display processor 183 causing the display 19 to display an authentication result, an authentication information updater 184 updating information in various databases and tables stored in the authentication apparatus storage 17 in accordance with an instruction from the authenticator 182, a data transmitter-receiver 185 for transmitting and receiving data to and from the information processing device 7 illustrated in FIG. 1 through the communicator 10, an identification information generator 186 generating identification information data, and a processing device 187 executing various other types of processing.

The authentication information acquirer 181 acquires biometric information and behavior information for authentication from the communicator 10, the image capture device 11, and the like. The authenticator 182 performs user authentication, based on the biometric information and the behavior information for authentication acquired from the authentication information acquirer 181 and an authentication value, an acceptance condition, and the like stored in various databases in the authentication apparatus storage 17.

The display processor 183 receives a user authentication result from the authenticator 182 and causes the display 19 to display a message, an image, and/or the like based on the authentication result. The authentication information updater 184 updates data stored in various databases and tables stored in the authentication apparatus storage 17 in accordance with an instruction from the authenticator 182.

The data transmitter-receiver 185 transmits and receives data to and from the information processing device 7 illustrated in FIG. 1 through the communicator 10. The identification information generator 186 generates identification information for determining that a target user for whom a service is provided is valid, that is, identification information for determining that a user performing transfer processing is valid. The identification information generator 186 also has a function to update the generated identification information. The processing device 187 executes various types of necessary processing when a user using the authentication apparatus 1 is authenticated to be the user himself or herself by the authenticator 182.

Figure 6A:
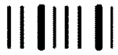
FIG. 6A is a diagram illustrating a table in an authentication biometric information database for storing biometric information acquired by the authentication apparatus illustrated in FIG. 1.

Next, structures of tables and data in the authentication biometric information database 171, the authentication behavior information database 172, and the inclination information table 173 stored in the authentication apparatus storage 17 are described below referring to FIG. 6A to FIG. 6C. First, as illustrated in FIG. 6A, the table in the authentication biometric information database 171 stores an authentication value determined by comparing a biometric information type such as face or voice, registered information being biometric information of the user himself or herself, and biometric information acquired by the authentication information acquirer 181 illustrated in FIG. 5.

The registered information stored in the table in the authentication biometric information database 171 is biometric information of the user himself or herself. The registered information is information preregistered before authentication processing is performed by the authentication apparatus 1 and is updated when the user is authenticated to be the user himself or herself. For example, the registered information stores a feature value determined from a facial image when the biometric information type is face, voice data, a feature value determined from the voice data, or both voice data and a feature value thereof when the biometric information type is voice, iris data when the biometric information type is iris, and a feature value determined from an image of a fingerprint when the biometric information type is fingerprint.

According to the present embodiment, determination of similarity of biometric information is performed based on an authentication value. An authentication value is a value determined based on a comparison result between registered information and biometric information acquired by the authentication information acquirer 181 illustrated in FIG. 5. The authentication value approaches 0 when the registered information and the biometric information acquired by the authentication information acquirer 181 are similar and approaches 1 when the two are not similar. The authentication biometric information database 171 includes the mean value of authentication values, an authentication threshold value being a threshold value for determining an authentication value, and an allowable authentication value acquired by including an allowable authentication range value indicating a gray situation of a user into the authentication threshold value.

First, the mean value of authentication values is the mean value of authentication values determined by comparing registered information with biometric information acquired by the authentication information acquirer 181. The authentication threshold value is a reference value for determining a user to be the user himself or herself when an authentication value determined based on a comparison result between registered information and biometric information acquired by the authentication information acquirer 181 is less than the authentication threshold value.

The authentication threshold value is a value varying by status of user authentication, and an upper limit thereof is predetermined. The upper limit is a value determined in such a way that a user should not be authenticated to be the user himself or herself, based solely on biometric information, when an authentication value determined by comparing the registered information with the biometric information acquired by the authentication information acquirer 181 is equal to or greater than the upper limit. For example, a default value of the authentication threshold value is set to 0.4 between an authentication value 0 being approached when registered information and biometric information acquired by the authentication information acquirer 181 are similar and an authentication value 1 being approached when the two are not similar. In this case, the upper limit of the authentication threshold value is set to a value acquired by adding 0.05 being half of 10% of the difference between the authentication value 0 being approached when the registered information and the biometric information are similar and the authentication value 1 being approached when the two are not similar to the default value of the authentication threshold value, that is, 0.45. The default value of the authentication threshold value and the added value may vary by group such as an age group or a gender of a user or may vary for each individual.

Further, the allowable authentication value is a reference value for determining a user not to be the user himself or herself when an authentication value determined based on a comparison result between registered information and biometric information acquired by the authentication information acquirer 181 is equal to or greater than the allowable authentication value. As described above, the allowable authentication value is a value acquired by including an allowable authentication range value indicating a gray situation of a user into the authentication threshold value. Therefore, the allowable authentication value is a value varying with variation of the authentication threshold value and the allowable authentication range value.

An upper limit is predetermined for the allowable authentication value and is referred to as a maximum allowable authentication value. The maximum allowable authentication value is a value determined in such a way that a user should be determined to be another person when an authentication value is equal to or greater than the maximum allowable authentication value. For example, the maximum allowable authentication value is set to 0.5 being a midpoint between the authentication value 0 being approached when registered information and biometric information acquired by the authentication information acquirer 181 are similar and the authentication value 1 being approached when the two are not similar.

A value between the authentication threshold value and the allowable authentication value is referred to as an allowable authentication range value. The allowable authentication range value is a value indicating a situation in which whether a user is the user himself or herself is gray. When an authentication value is within the allowable authentication range value, determination of whether a user is the user himself or herself is not performed solely by biometric information, and determination including user-specific behavior information is performed. Specifically, when user-specific behavior information meets an acceptance condition in a case of an authentication value being within the allowable authentication range value, a user is authenticated to be the user himself or herself.

Further, when user-specific behavior information does not meet the acceptance condition in the case of an authentication value being within the allowable authentication range value, a user is not authenticated to be the user himself or herself. User authentication based on behavior information is hereinafter referred to as supplementary authentication. The allowable authentication range value is a value predetermined in such a way that a user may be for the most part considered as the user himself or herself when an authentication value falls within the range. For example, the allowable authentication range value is set to 0.08 being a value equal to or less than 10% of the difference between the authentication value 0 being approached when registered information and biometric information acquired by the authentication information acquirer 181 are similar and the authentication value 1 being approached when the two are not similar.

When the authentication threshold value reaches the upper limit, the allowable authentication range value is set to a value acquired by subtracting the upper limit of the authentication threshold value from the maximum allowable authentication value. For example, assuming the upper limit of the authentication threshold value to be 0.45 and the maximum allowable authentication value to be 0.5, the allowable authentication range value is 0.05. Accordingly, when the authentication threshold value reaches the upper limit, the value of the allowable authentication range value takes a value smaller than a value in a case of the authentication threshold value not reaching the upper limit.

Next, the table in the authentication behavior information database 172 is described below referring to FIG. 6B. The table in the authentication behavior information database 172 stores a user behavior type such as communication connection or event execution, acquired information acquired by the authentication information acquirer 181 illustrated in FIG. 5, the latest status in each behavior, and an acceptance condition of each behavior.

For example, acquired information stores a destination address, a service set identifier (SSID), a basic service set identifier (BSSID), or the like when the behavior type is communication connection, location information such as a name and an address of a location where an event previously retained in a schedule book takes place when the behavior type is event execution, a distance when the behavior type is the distance between the face and the terminal device, and a name, an identifier (ID), or the like indicating a connected device when the behavior type is device connection.

For example, the latest status in each behavior is the total count of past connections to a communication connection destination indicated in acquired information when the behavior type is communication connection. An initial value of the total count of connections to a communication connection destination or the like is set to 0, and the count is added with a connection to the communication connection destination, or the like. Further, when the behavior type is event execution, the distance between a location stored in acquired information and the current location of the user is stored.

When the behavior type is the distance between the face and the authentication apparatus 1, the mean distance between the face and the authentication apparatus 1 calculated at the time of the user being authenticated as the user himself or herself in the past is stored. The mean distance between the face and the authentication apparatus 1 is updated every time the user is authenticated to be the user himself or herself. An initial value of the mean distance between the face and the authentication apparatus 1 is set to a distance determined at the time of preregistration of the biometric information illustrated in FIG. 6A before authentication of the user himself or herself is performed by the authentication apparatus 1.

Further, when the behavior type is device connection, whether a device indicated by a name, an ID, or the like stored in acquired information is connected is stored. For example, device connection refers to connection between a device and the authentication apparatus 1 pair-set by Bluetooth (registered trademark). An acceptance condition of each behavior is a condition predetermining a condition by which reliability of the behavior can be guaranteed.

Next, FIG. 6C illustrates the table in the inclination information table 173. The inclination information table 173 stores an angle indicating the inclination of the authentication apparatus 1 and being acquired from the inclination detector 13 illustrated in FIG. 5, an acquisition date and time at which the angle is acquired, and a standby time being an interval for detecting inclinations. Every time the standby time elapses, an angle indicating the inclination of the authentication apparatus 1 is acquired from the inclination detector 13 by the authentication information acquirer 181 illustrated in FIG. 5 and is updated. Further, when the angle is updated, the acquisition date and time at which the angle is acquired is also updated.

Figure 7:
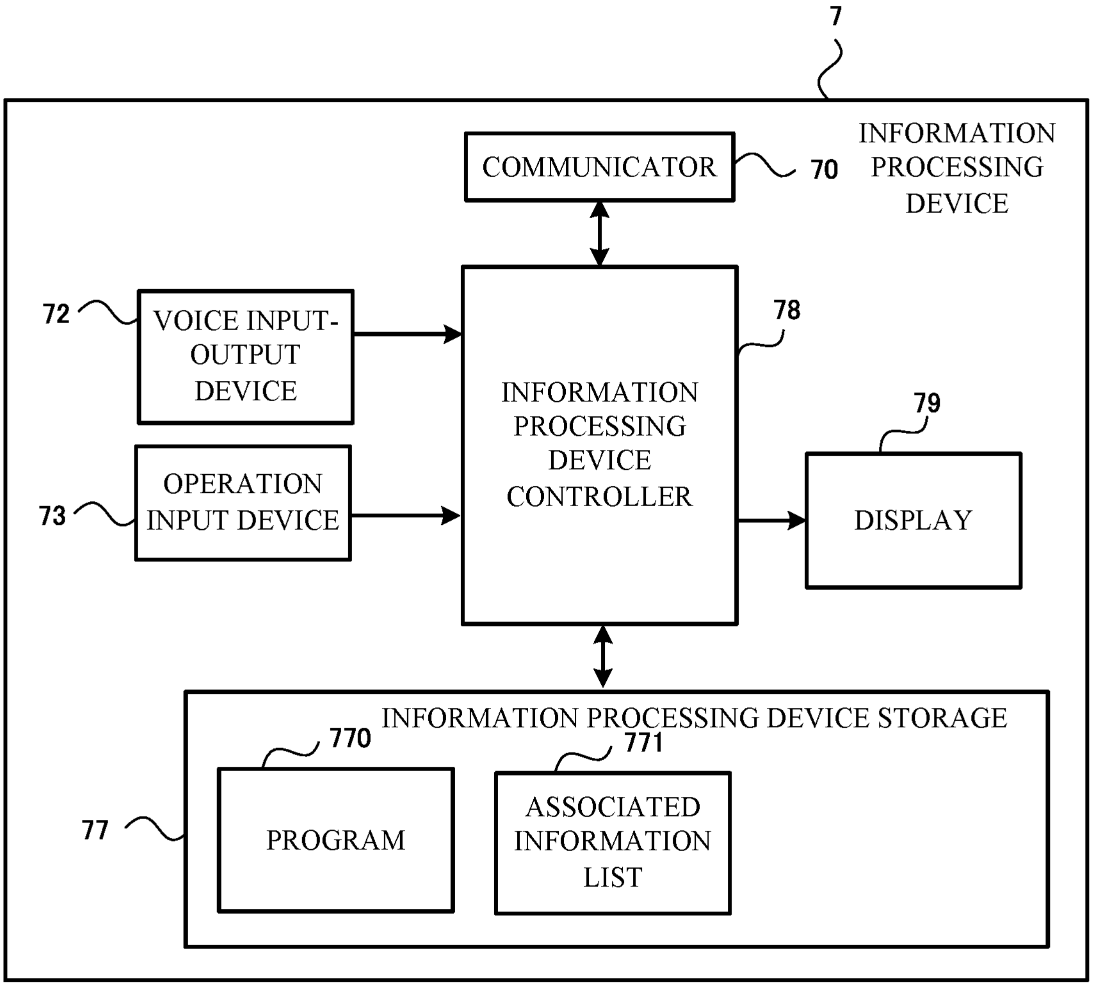
FIG. 7 is a block diagram of an information processing device illustrated in FIG. 1.

Next, a configuration of the information processing device 7 is described. The information processing device 7 is a terminal identifying a service provision target user, based on identification information generated by the authentication apparatus 1 and providing the service for the identified user. As described above, the information processing device 7 according to the present embodiment determines validity of an authentication target user based on the identification information and provides a financing service to a user who has been recognized as valid (in other words, the information processing device 7 instructs the financial institution 99 to make a transfer). FIG. 7 is a block diagram illustrating a configuration of the information processing device 7. As described above, the information processing device 7 is a personal computer, a smartphone, or a tablet terminal and includes a communicator 70, a voice input-output device 72, an operation input device 73, an information processing device storage 77, an information processing device controller 78, and a display 79. The information processing device 7 may further include an inclination detector 13, a fingerprint detector 15, and a position detector 16, similarly to the authentication apparatus 1.

The communicator 70, the voice input-output device 72, and the operation input device 73 in the information processing device 7 are similar to the communicator 10, the voice input-output device 12, and the operation input device 14 in the authentication apparatus 100, and therefore description thereof is omitted.

The information processing device storage 77 includes a program 770 for determining validity of an authentication target user and an associated information list 771 in which the identification information and a public key of the authentication apparatus are associated with each other. Further, the information processing device storage 77 stores various application programs executed by the information processing device 7.

The information processing device controller 78 executes various programs (including the program 770) stored in the information processing device storage 77. Further, the information processing device controller 78 acquires various types of data from the communicator 70, the voice input-output device 72, and the operation input device 73, processes the data, and stores the data into various databases, tables, and the like in the information processing device storage 77.

The display 79 displays processing results of various programs executed by the information processing device controller 78. Further, the display 79 can also display data input from the operation input device 73, and the like. When the information processing device 7 is a smartphone or a tablet terminal, the display 79 may be superposed on the operation input device 73 in such a way as to configure a touch panel.

Figure 8:
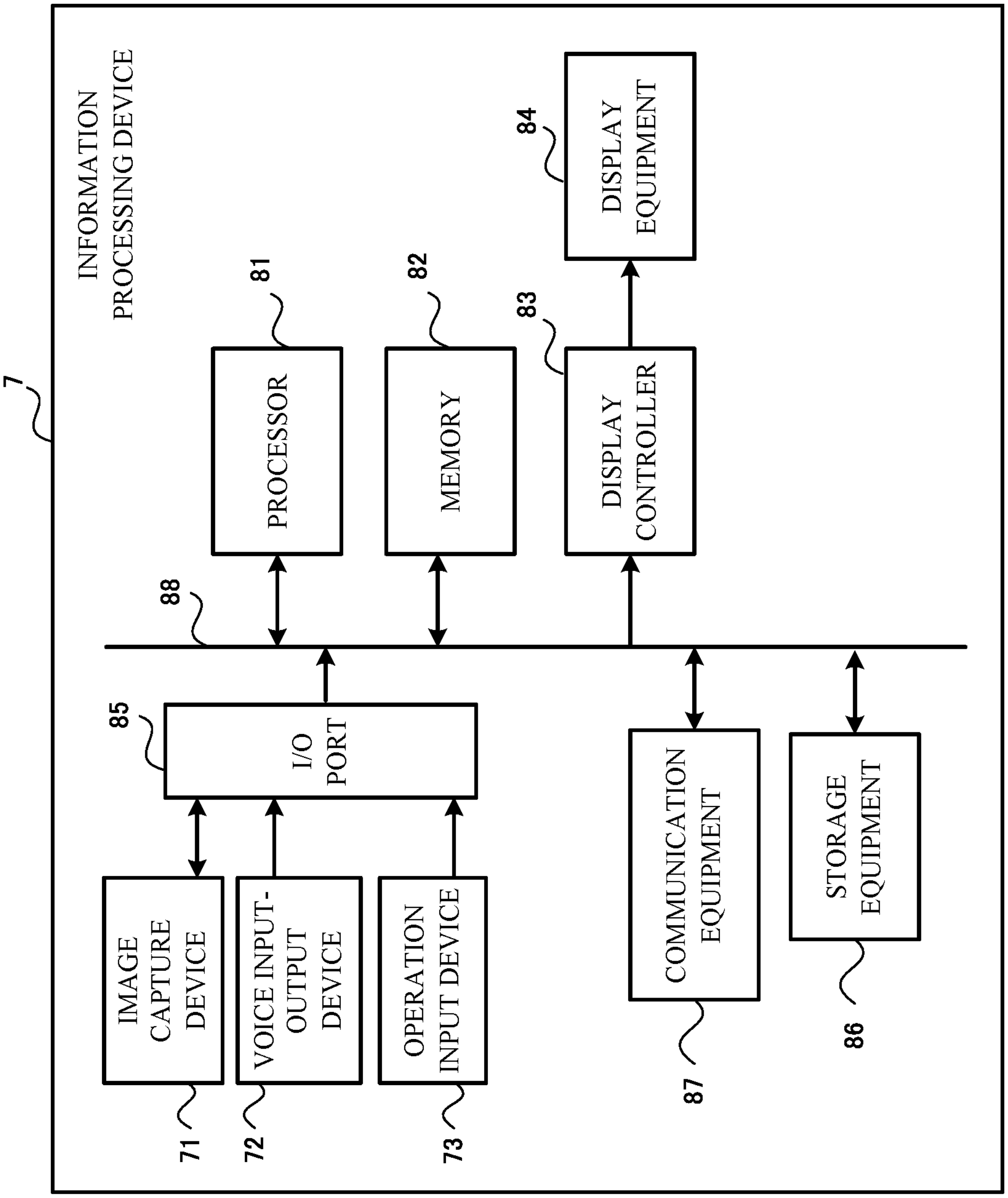
FIG. 8 is a diagram illustrating an example of a hardware configuration of the information processing device illustrated in FIG. 1.

Next, an example of a hardware configuration of the information processing device 7 is described referring to FIG. 8. The information processing device 7 includes a processor 81 executing various programs, a memory 82 for loading various programs, a display controller 83 outputting various types of display data, display equipment 84 displaying various types of display data, an I/O port 85 for connecting the voice input-output device 72 and the like, storage equipment 86 storing various programs and various types of data, and communication equipment 87 communicating with the outside and transmitting and receiving various types of data, similarly to the authentication apparatus 1. The processor 81, the memory 82, the display controller 83, the display equipment 84, the I/O port 85, the storage equipment 86, and the communication equipment 87 are interconnected through a data bus 88. The processor 81, the memory 82, the display controller 83, the display equipment 84, the I/O port 85, the storage equipment 86, the communication equipment 87, and the data bus 88 are similar to the processor 21, the memory 22, the display controller 23, the display equipment 24, the I/O port 25, the storage equipment 26, the communication equipment 27, and the data bus 28 in the authentication apparatus 1, and therefore description thereof is omitted.

Figure 9:
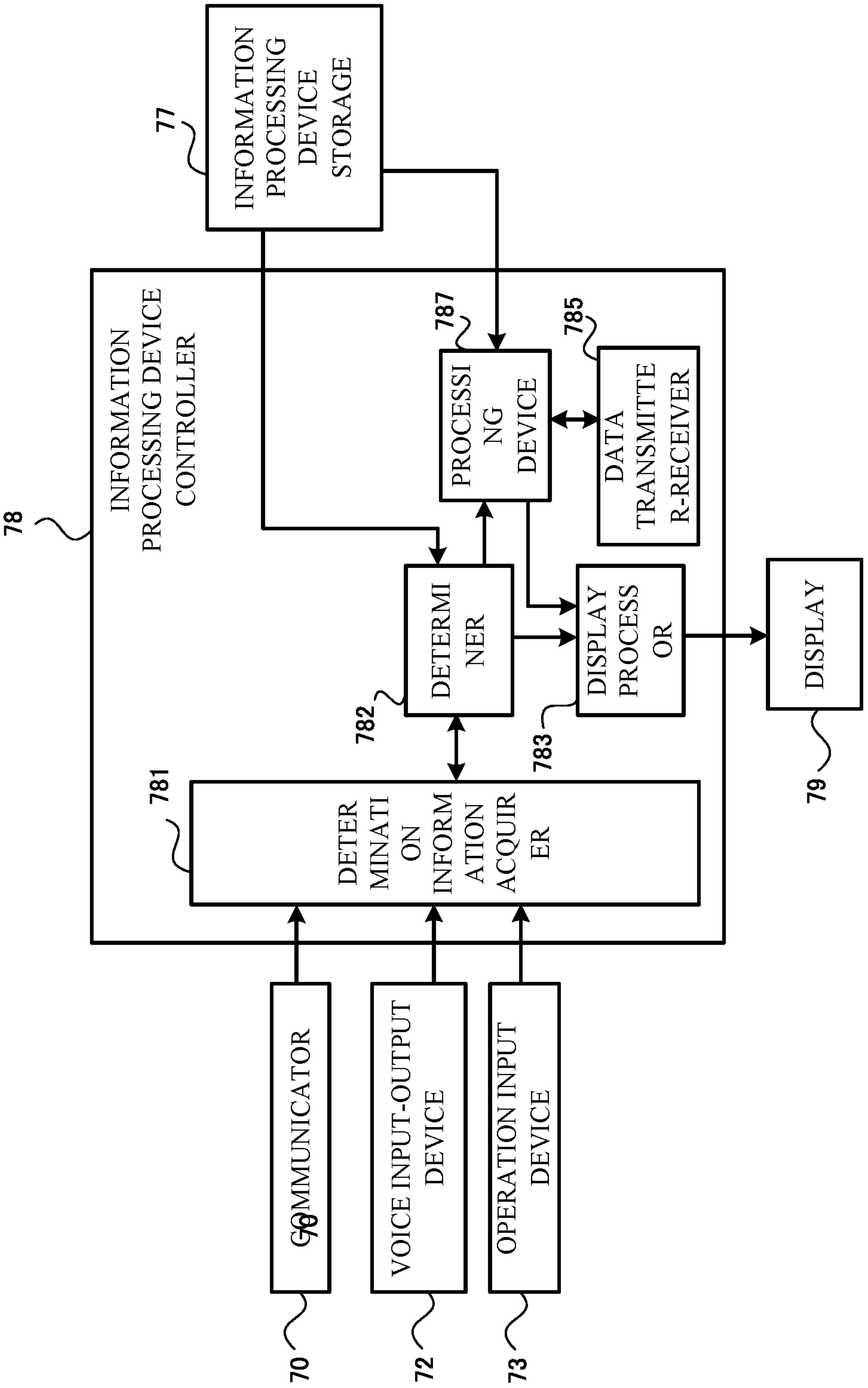
FIG. 9 is a diagram illustrating an information processing block in the information processing device illustrated in FIG. 1.

By executing the program 770 stored in the information processing device storage 77 in the information processing device 7 illustrated in FIG. 7 by the processor 81, an information processing block (each functional component) is implemented in the information processing device controller 78 illustrated in FIG. 9. Thus, the information processing device 7 can determine validity of an authentication target user and instruct the financial institution 99 to provide a financing service to a user who has been recognized as valid.

The information processing block implemented by the processor 21 includes a determination information acquirer 781 acquiring information for determination from the communicator 10 and the like, a determiner 782 determining validity of a user, a display processor 783 causing the display 79 to display a determination result, a data transmitter-receiver 785 for transmitting and receiving data to and from the financial institution 99 or the authentication apparatus 1 illustrated in FIG. 1 through the communicator 70, and a processing device 787 executing various other types of processing.

The determination information acquirer 781 acquires determination information for determination from the communicator 10 and the like. The determiner 782 determines validity of a user based on determination information acquired from the determination information acquirer 781.

Specifically, the determination information acquirer 781 acquires the identification information and the public key of the authentication apparatus from the authentication apparatus 1 through the communicator 10. Further, the public key of the authentication apparatus may be input by an operation on the operation input device 73. In addition, the public key of the authentication apparatus may be input from the voice input-output device 72. Based on the identification information and the public key of the authentication apparatus acquired by the determination information acquirer 781, the determiner 782 identifies an authentication target user from the reference information list 771 in the information processing device storage 77 and determines validity of a user. Further, the determiner 782 updates, in cooperation with the processing device 787, the identification information that has been updated. Specifically, the identification information stored in the associated information list 771 in the information processing device storage 77 is updated to a newer version of the identification information.

The display processor 783 causes the display 79 to display a message, an image, and/or the like based on the determination result from the determiner 782 and a processing result from the processing device 787. In addition, when validity of a user is not recognized, for example, an action of causing the voice input-output device 72 to output a voice may be added.

The data transmitter-receiver 785 transmits and receives data to and from the financial institution 99 and/or the authentication apparatus 1 illustrated in FIG. 1 through the communicator 70. The processing device 787 executes processing of generating a service provision instruction for the financial institution 99 based on the determination result from the determiner 782, and various other types of processing.

Next, a data structure of the reference information list 771 stored in the information processing device storage 77 is described referring to FIG. 10. The associated information list 771 illustrated in FIG. 10 is stored in the information processing device storage 77 in the processing in Step S218 (see FIG. 13A) to be described below. As illustrated, in the associated information list 771, the identification information and the public key of the authentication apparatus are associated with each other. Therefore, the associated information list 771 provides information that enables the information processing device 7 to identify which user contained in pieces of the identification information corresponds to a service provision target user. In the present embodiment, since identification information generation processing (see FIG. 13A) to be described below is executed for each service to be provided, the identification information and the public key of the authentication apparatus are generated for each service. Therefore, even if a user is the same, the identification information and the public key of the authentication apparatus that are different for each service are registered in the associated information list 771. Thus, the same information is not registered for a user who utilizes a plurality of services, which prevents the information processing device 7 from recognizing that the user is the same for the plurality of services. In a different approach, for example, the same public key of the authentication apparatus may be used for a plurality of services while the identification information is different for each service. Specifically, the identification information may be caused to be different for each service by executing update processing (see FIG. 14) to be described below; in other words, the identification information may be newly registered in the processing in Step S413 illustrated in FIG. 14. In this manner, the same public key of the authentication apparatus can be used for a plurality of services while the identification information is different for the plurality of services; therefore, processing load can be lightened while security is ensured. Although the identification information and the public key of the authentication apparatus are associated with each other in the illustrated example of the associated information list 771, a common key SK generated in the processing in Step S208A (see FIG. 13A) to be described below may be additionally associated with the identification information and the public key of the authentication apparatus. In a different approach, only the public key of the authentication apparatus may be registered in the associated information list 771.

The above describes the configurations of the authentication apparatus 1 and the information processing device 7 in the authentication system 100. Next, operation of the authentication apparatus 1 and the information processing device 7 is described referring to FIG. 11A to FIG. 14. An example in which a transfer is performed as a financing service at a so-called internet banking as described above is described in the present embodiment.

First, user authentication is performed in authentication processing in the authentication apparatus 1. Then, the identification information is generated by execution of determination instruction processing, and by transmitting the generated identification information to the information processing device 7, determination of validity of a user is further determined by the information processing device 7. When validity of a user is recognized by the information processing device 7, the information processing device 7 transmits a transfer instruction to the financial institution 99, and transfer processing is performed. Note that the authentication processing in the authentication apparatus 1 is processing performed in the background. The authentication apparatus 1 transmits, to the information processing device 7, login information such as a login ID and a password issued by the financial institution 99, while the information processing device 7 transmits, to the financial institution 99, login information in addition to the transfer instruction. Therefore, in the present embodiment, the transfer processing is performed upon reception of the transfer instruction from the information processing device 7 and determination that the login information received from the information processing device 7 is valid. The information processing device 7 may further determine validity of the login information. Although an example in which authentication of a user is performed in the background is described in the present embodiment, authentication of a user is not limited to that to be performed in the background. Upon successful authentication of a user, a first condition is satisfied.

First, the authentication processing is described with reference to FIG. 11A and FIG. 11B. When completing execution of initialization processing after power is turned on or when returning from a sleep state, the authentication apparatus 1 enters a lock state in which operation of each function is not permitted until authentication is successful. When the lock state is entered or when authentication is requested during operation of each function, the authentication apparatus controller 18 illustrated in FIG. 3 executes the authentication processing program 170 stored in the authentication apparatus storage 17 and starts the authentication processing for determining whether a user is the user himself or herself. Although a facial image of a user is used as biometric information in this example, the biometric information is not limited to the facial image and may be a fingerprint, a voiceprint, an iris, or the like, or combination thereof. The authentication processing may be started, for example, when an application for a financing service is run, and may be continuously performed while the application is running. In the present embodiment, it is described for ease of understanding on the assumption that the authentication processing is started when a user who desires to use a financing service starts an application for the financing service (an application of a so-called internet banking), and the authentication processing is repeatedly executed in the background while the application is running (from when the application is started until when the application is ended).

When the authentication processing is started, the authentication information acquirer 181 illustrated in FIG. 5 causes the image capture device 11 to take a facial photograph of a user operating the authentication apparatus 1. Specifically, the authentication information acquirer 181 causes the front-facing camera 11A to take a facial photograph of the user facing the front of the authentication apparatus 1. Thus, the authentication information acquirer 181 acquires the taken facial photograph of the user from the image capture device 11 (Step S101).

Next, the authentication information acquirer 181 determines whether the acquired facial photograph of the user is unblurred (Step S102). When the facial photograph of the user is not unblurred (Step S102: NO), the authentication information acquirer 181 causes the image capture device 11 to retry taking a facial photograph of the user (Step S103). Further, when the facial photograph of the user is unblurred (Step S102: YES), the authentication information acquirer 181 determines whether the face of the user can be detected from the facial photograph of the user caused to be taken by the image capture device 11 (Step S104).

When the face of the user cannot be detected from the facial photograph of the user (Step S104: NO), the authentication information acquirer 181 causes the image capture device 11 to retry taking a facial photograph of the user (Step S103). When the face of the user cannot be detected from the facial photograph of the user, an action such as locking the operation in order to prevent the currently operating user from further performing operation, or displaying a message prompting use of another authentication method may be taken. Further, when the face of the user is detected from the facial photograph of the user (Step S104: YES), the authentication information acquirer 181 determines a feature value of the image of the detected face of the user. The authentication information acquirer 181 transmits the determined feature value of the facial image of the user to the authentication determiner 182.

The authentication determiner 182 acquires the authentication biometric information database 171 stored in the authentication apparatus storage 17 illustrated in FIG. 3. The authentication determiner 182 acquires a feature value of a facial image stored in registered information associated with "face" out of biometric information types, and an allowable authentication value and an authentication threshold value of an authentication value from the table in the authentication biometric information database 171 illustrated in FIG. 6A. The authentication determiner 182 compares the feature value of the facial image in the registered information acquired from the authentication biometric information database 171 with the feature value of the facial image received from the authentication information acquirer 181 and determines an authentication value of the face, based on the comparison result. The authentication determiner 182 determines whether the determined authentication value of the face is equal to or greater than the authentication threshold value acquired from the authentication biometric information database 171 (Step S105).

When the determined authentication value of the face is equal to or greater than the authentication threshold value (Step S105: YES), the authentication determiner 182 determines whether the determined authentication value of the face is equal to or less than the allowable authentication value acquired from the authentication biometric information database 171 (Step S106). When the determined authentication value of the face is equal to or less than the allowable authentication value (Step S106: YES), whether the user using the authentication apparatus 1 is the user himself or herself is gray, and therefore the authentication determiner 182 executes supplementary authentication being authentication by behavior information. First, the authentication determiner 182 causes the authentication information acquirer 181 to acquire a currently connected communication connection destination from the communicator 10. The authentication determiner 182 receives the acquired current communication connection destination of the communicator 10 from the authentication information acquirer 181.

Next, the authentication determiner 182 acquires the authentication behavior information database 172 from the authentication apparatus storage 17 illustrated in FIG. 3. The authentication determiner 182 acquires acquired information, a count, and an acceptance condition associated with "communication connection" out of behavior types stored in the table in the authentication behavior information database 172 illustrated in FIG. 6B. For example, SSIDs ABC_WLAN and 123WLAN are stored in the acquired information for "communication connection" as illustrated in FIG. 6B. For this ABC_WLAN, 31 as a connection count and a connection count equal to or greater than 100 as an acceptance condition are stored. Further, for 123WLAN, 157 as a connection count and a connection count equal to or greater than 100 as an acceptance condition are stored. A case of satisfying an acceptance condition is hereinafter referred to as a reliable case, and a case of not satisfying an acceptance condition is referred to as an unreliable case.

By comparing the current communication connection destination of the communicator 10 received from the authentication information acquirer 181 with the acquired information acquired from the authentication behavior information database 172, the authentication determiner 182 determines whether the current communication connection destination is an unreliable connection destination (Step S107). For example, it is assumed here that the SSID ABC_WLAN is acquired as the current communication connection destination of the communicator 10. For ABC_WLAN in the acquired information for the behavior type "communication connection" stored in the authentication behavior information database 172, the connection count is 31, and the acceptance condition is a connection count equal to or greater than 100. Accordingly, the current communication connection destination is an unreliable communication connection destination (Step S107: YES), and therefore whether a reliable event is executed is determined (Step S108).

The authentication determiner 182 causes the authentication information acquirer 181 to acquire a content of an event executed immediately before from the operation input device 14. From a calendar included in the authentication apparatus 1, the authentication determiner 182 acquires whether a scheduled event exists at the current date and time and information about a location where the scheduled event takes place. When a scheduled event does not exist on the day, the authentication determiner 182 determines nonexistence of execution of a reliable event (Step S108: YES) and calculates the distance between the face and the authentication apparatus 1 (Step S109). Further, when a scheduled event exists on the day, the authentication determiner 182 causes the authentication information acquirer 181 to acquire the current positional information from the position detector 16. Next, the authentication determiner 182 acquires the authentication behavior information database 172 from the authentication apparatus storage 17 illustrated in FIG. 3.

The authentication determiner 182 acquires acquired information and an acceptance condition associated with "event execution" out of the behavior types stored in the table in the authentication behavior information database 172 illustrated in FIG. 6B. For example, it is assumed that "○×Park" and "Δ●Movie Theater" are stored as locations where events take place in the acquired information for "event execution" and that "a distance within 100 m" is stored as an acceptance condition for both locations, as described in FIG. 6B.

For example, it is assumed here that "○×Park" is stored as a location of an event taking place at the current date and time on the calendar included in the authentication apparatus 1. The authentication determiner 182 compares the current positional information caused to be acquired from the position detector 16 by the authentication information acquirer 181 with positional information of "○×Park" being the location of the event taking place at the current date and time. For example, it is assumed that the distance between the current positional information and the positional information of "○×Park" being the location of the event is 113 m. In this case, execution of a reliable event is determined to be nonexistent (Step S108: YES), and the distance between the face and the authentication apparatus 1 is calculated (Step S109). The distance between the face of the user and the authentication apparatus 1 is calculated based on the proportion of the face of the user in the facial photograph of the user facing the front of the authentication apparatus 1, the photograph being taken by the front-facing camera 11A illustrated in FIG. 2.

Next, the authentication determiner 182 acquires the authentication behavior information database 172 from the authentication apparatus storage 17 illustrated in FIG. 3. The authentication determiner 182 acquires a mean distance and an acceptance condition associated with "the distance between the face and the terminal device" out of the behavior types stored in the table in the authentication behavior information database 172 illustrated in FIG. 6B. For example, 262 mm is stored as a mean distance and within plus or minus 20 mm of the mean distance as an acceptance condition for "the distance between the face and the terminal device," as illustrated in FIG. 6B.

The authentication determiner 182 determines whether the distance between the face of the user and the authentication apparatus 1 calculated in Step S109 is within a setting range set in the acceptance condition acquired from the authentication behavior information database 172 (Step S110). Specifically, the mean distance acquired from the authentication behavior information database 172 is 262 mm, and the acceptance condition is within plus or minus 20 mm of the mean distance; and therefore whether the distance falls within a range from 242 mm to 282 mm is determined.

When the distance between the face of the user and the authentication apparatus 1 calculated in Step S109 falls within the range from 242 mm to 282 mm (Step S110: YES), the authentication determiner 182 authenticates the user using the authentication apparatus 1 to be the user himself or herself. The authentication determiner 182 causes the authentication information updater 184 to update various types of data stored in the authentication biometric information database 171 and the authentication behavior information database 172 illustrated in FIG. 2 (Step S111).

Specifically, the authentication information updater 184 updates registered information associated with the biometric information type "face" in the table in the authentication biometric information database 171 illustrated in FIG. 6A by adding a feature value of the facial image received from the authentication information acquirer 181 by the authentication determiner 182 to a feature value of the facial image stored in the registered information. Next, the authentication information updater 184 updates a count stored in the latest status associated with the behavior type "communication connection" in the table in the authentication behavior information database 172 illustrated in FIG. 6B by adding 1. Further, the authentication information updater 184 updates the latest status associated with the behavior type "the distance between the face and the terminal device" stored in the table in the authentication behavior information database 172 illustrated in FIG. 6B with a mean distance determined from the stored mean distance and "the distance between the face and the terminal device" calculated in Step S109.

Thus, precision of biometric information and behavior information of a user is improved by updating biometric information stored in the authentication biometric information database 171 and behavior information stored in the authentication behavior information database 172. Therefore, precision of user authentication can be improved.

Further, when the authentication value of the face determined by the authentication determiner 182 is not equal to or greater than the authentication threshold value of the authentication value (Step S105: NO), the authentication determiner 182 causes the authentication information acquirer 181 to acquire a currently connected communication connection destination from the communicator 10. The authentication determiner 182 receives the acquired current communication connection destination of the communicator 10 from the authentication information acquirer 181. Next, the authentication determiner 182 acquires the authentication behavior information database 172 from the authentication apparatus storage 17 illustrated in FIG. 2. The authentication determiner 182 acquires acquired information, a count, and an acceptance condition associated with "communication connection" out of the behavior types stored in the table in the authentication behavior information database 172 illustrated in FIG. 6B. The authentication determiner 182 determines whether the current communication connection destination is a reliable connection destination by comparing the current communication connection destination of the communicator 10 received from the authentication information acquirer 181 with the acquired information acquired from the authentication behavior information database 172 (Step S112).

For example, it is assumed here that the SSID 123WLAN is acquired as the current communication connection destination of the communicator 10. For 123WLAN in the acquired information for the behavior type "communication connection" stored in the authentication behavior information database 172A, the connection count is 156, and the acceptance condition is a connection count equal to or greater than 100. Accordingly, the current communication connection destination is a reliable communication connection destination (Step S112: YES), and therefore the authentication determiner 182 authenticates the user using the authentication apparatus 1 to be the user himself or herself. Subsequently, the authentication determiner 182 causes the authentication interval to be longer than the current authentication interval (Step S113). The reason is that when the current communication connection destination is a reliable communication connection destination, the user himself or herself is considered to be in a reliable environment such as a home or a workplace. In this case, the authentication frequency may be decreased and authentications may be performed a minimally required number of times by causing the authentication interval to be longer than the current authentication interval.

For example, it is assumed here that the SSID ABC_WLAN is acquired as the current communication connection destination of the communicator 10. For ABC_WLAN in the acquired information for the behavior type "communication connection" stored in the authentication behavior information database 172A, the connection count is 31, and the acceptance condition is a connection count equal to or greater than 100. Accordingly, the current communication connection destination is not a reliable communication connection destination (Step S112: NO), and therefore the authentication determiner 182 does not authenticate the user using the authentication apparatus 1 to be the user himself or herself and does not cause the authentication interval to be longer than the current authentication interval.

For example, it is assumed in Step S107 that the SSID 123WLAN is acquired as the current communication connection destination of the communicator 10. For 123WLAN in the acquired information for the behavior type "communication connection" stored in the authentication behavior information database 172, the connection count is 156, and the acceptance condition is a connection count equal to or greater than 100. Accordingly, the current communication connection destination is a reliable communication connection destination (Step S107: NO), and therefore the authentication determiner 182 authenticates the user using the authentication apparatus 1 to be the user himself or herself.

Further, for example, it is assumed in Step S108 that "Δ●Movie Theater" is stored as a location of an event taking place at the current date and time on the calendar included in the authentication apparatus 1. The authentication determiner 182 compares the current positional information caused to be acquired from the position detector 16 by the authentication information acquirer 181 with positional information of "Δ●Movie Theater" being the location of the event taking place at the current date and time. For example, it is assumed that the distance between the current positional information and the positional information of "Δ●Movie Theater" being the location of the event is 72 m. In this case, the authentication determiner 182 determines execution of a reliable event to be not nonexistent (Step S108: NO) and authenticates the user using the authentication apparatus 1 to be the user himself or herself.

The authentication determiner 182 causes the authentication interval to be longer than the current authentication interval (Step S113). The authentication determiner 182 calculates the distance between the face of the user and the authentication apparatus 1 (Step S114). Next, the authentication determiner 182 acquires the authentication behavior information database 172 from the authentication apparatus storage 17 illustrated in FIG. 3. The authentication determiner 182 determines whether the distance between the face of the user and the authentication apparatus 1 calculated in Step S114 falls within a setting range set in an acceptance condition acquired from the authentication behavior information database 172 (Step S115). When the distance between the face of the user and the authentication apparatus 1 calculated in Step S109 falls within the setting range (Step S115: YES), the authentication determiner 182 authenticates the user using the authentication apparatus 1 to be the user himself or herself. The authentication determiner 182 causes the authentication information updater 184 to update various types of data stored in the authentication biometric information database 171 and the authentication behavior information database 172 illustrated in FIG. 3 (Step S111).

Specifically, the authentication information updater 184 updates registered information associated with the biometric information type "face" in the table in the authentication biometric information database 171 illustrated in FIG. 6A by adding a feature value of the facial image received from the authentication information acquirer 181 by the authentication determiner 182 in Step S105 to a feature value of the facial image stored in the registered information.

Next, the authentication information updater 184 updates a count stored in the latest status associated with the behavior type "communication connection" in the table in the authentication behavior information database 172 illustrated in FIG. 6B by adding 1. Next, the authentication information updater 184 updates the latest status associated with the behavior type "event execution" in the table in the authentication behavior information database 172 by writing the distance between the location of the event determined in Step S108: NO and the authentication apparatus 1 into the latest status. Further, the authentication information updater 184 updates the latest status associated with the behavior type "the distance between the face and the terminal device" stored in the table in the authentication behavior information database 172 illustrated in FIG. 6B with a mean distance determined from the mean distance stored in the latest status and "the distance between the face and the terminal device" calculated in Step S114.

When the distance between the face of the user and the authentication apparatus 1 calculated in Step S114 does not fall within the setting range (Step S115: NO), the authentication determiner 182 does not cause the authentication information updater 184 to update various types of data stored in the authentication biometric information database 171 and the authentication behavior information database 172 illustrated in FIG. 3.

Further, when the authentication value of the face determined by the authentication determiner 182 is not equal to or less than the allowable authentication value of the authentication value (Step S106: NO) or the distance between the face and the terminal device does not fall within the setting range in Step S110 (Step S110: NO), the authentication determiner 182 determines the user using the authentication apparatus 1 not to be the user himself or herself. The authentication determiner 182 causes the display processor 183 illustrated in FIG. 5 to display that the authentication is unsuccessful on the display 19. Next, the authentication determiner 182 calls existing biometric authentication means included in the authentication apparatus 1. It is assumed here that fingerprint authentication is called as the existing biometric authentication means. The authentication determiner 182 executes the fingerprint authentication (Step S116).

When the fingerprint authentication is successful (Step S117: YES), the authentication information acquirer 181 causes the image capture device 11 to take a facial photograph of the user operating the authentication apparatus 1 in accordance with an instruction from the authentication determiner 182. The authentication information acquirer 181 acquires an image of the taken facial photograph of the user from the image capture device 11 and determines a feature value of the facial image of the user. The authentication information acquirer 181 transmits the determined feature value of the facial image of the user to the authentication determiner 182. The authentication determiner 182 transmits the received feature value of the facial image of the user to the authentication information updater 184 illustrated in FIG. 5. The authentication information updater 184 updates a feature value of the facial image stored in registered information associated with the biometric information type "face" in the table in the authentication biometric information database 171 illustrated in FIG. 6A by adding the received feature value of the facial image of the user to the stored feature value (Step S118). The authentication determiner 182 returns to Step S101 and executes the steps in and after Step S101.

Further, when the fingerprint authentication is not successful (Step S117: NO), the authentication determiner 182 causes the display processor 183 illustrated in FIG. 5 to display that the authentication is unsuccessful on the display 19. Next, the authentication determiner 182 causes the display processor 183 illustrated in FIG. 5 to display a login screen on the display 19 (Step S119).

Figure 11A:
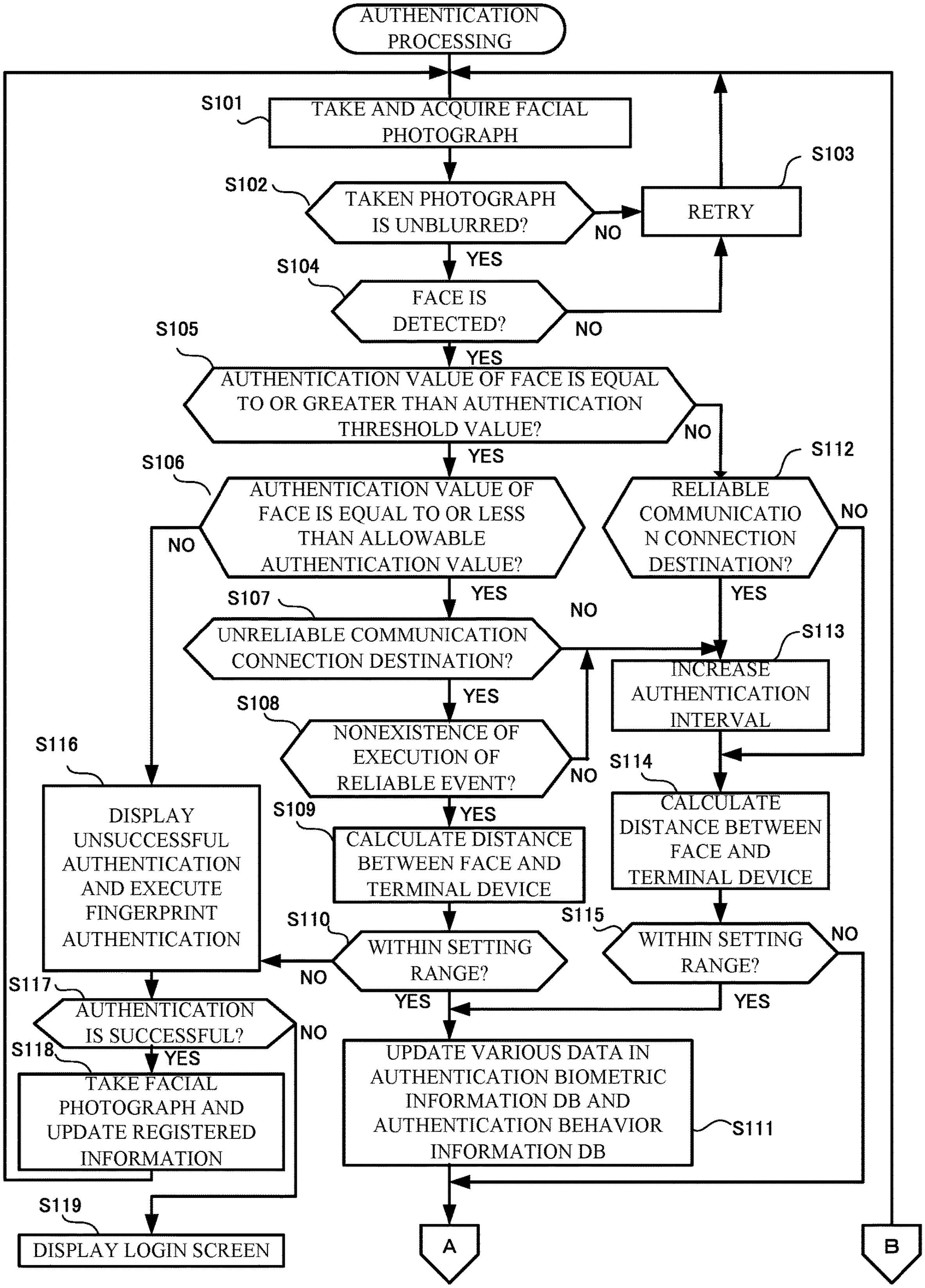
FIG. 11A is a flowchart illustrating an example of authentication processing.
Figure 11B:
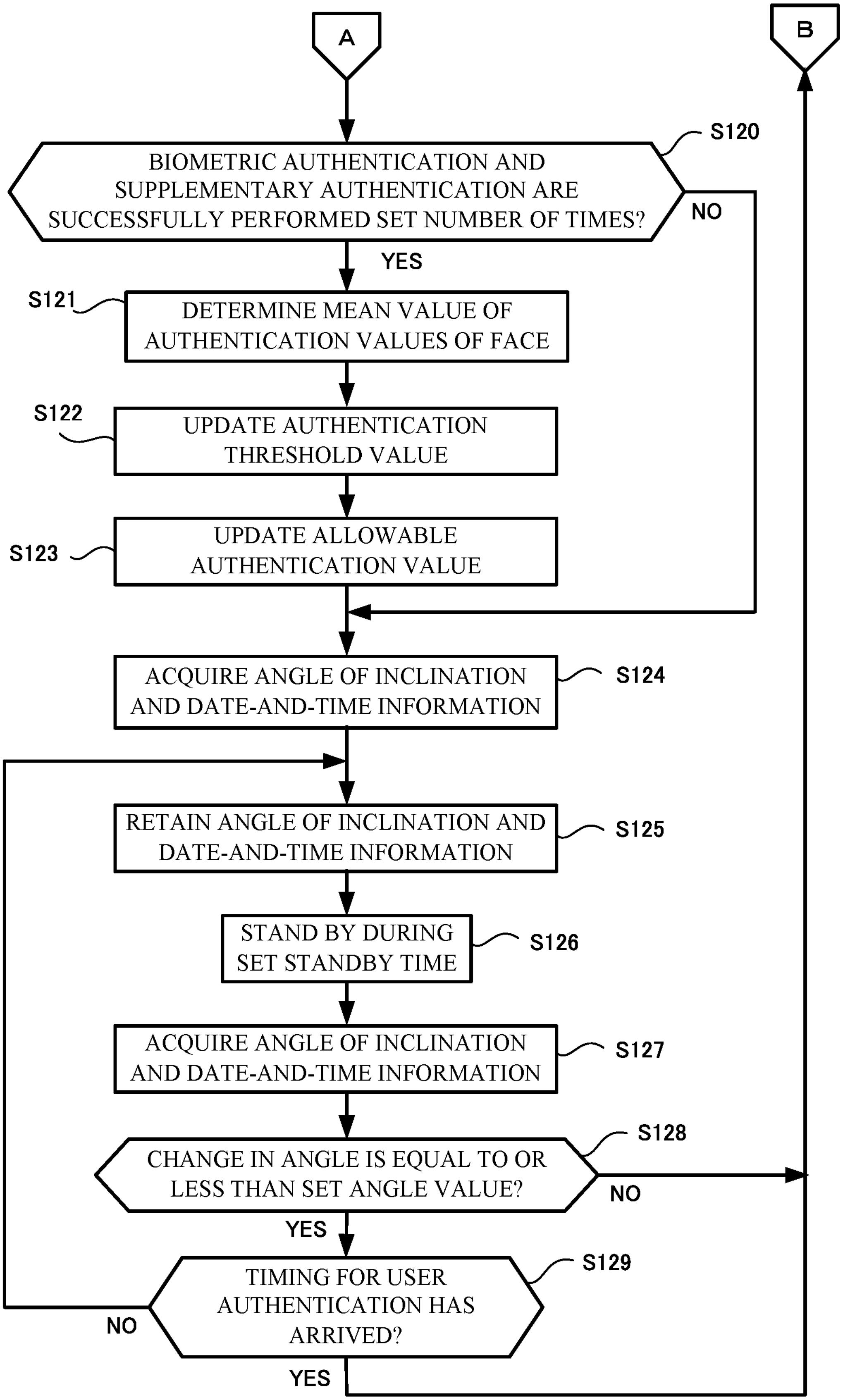
FIG. 11B is a flowchart illustrating the example of the authentication processing.

The processing advances to FIG. 11B. The authentication determiner 182 determines whether the biometric authentication and the supplementary authentication are successfully performed a preset number of times (Step S120). For example, the preset number of times is any number of times such as 10 consecutive times or a total of 20 times after the authentication apparatus 1 is started. When the biometric authentication and the supplementary authentication are successfully performed the preset number of times (Step S120: YES), the authentication determiner 182 determines the mean value of authentication values of the face determined by the preset number of authentications (Step S121). Specifically, the authentication determiner 182 acquires the authentication biometric information database 171 illustrated in FIG. 3 from the authentication apparatus storage 17. The authentication determiner 182 acquires the mean value of authentication values associated with "face" out of the biometric information types from the table in the authentication biometric information database 171 illustrated in FIG. 6A. The authentication determiner 182 calculates the mean value of authentication values of the face by adding the authentication value of the face determined in Step S105 and the mean value of authentication values acquired from the authentication biometric information database 171 and then dividing the sum by 2. Further, when the biometric authentication and the supplementary authentication are not successfully performed the preset number of times (Step S120: NO), the authentication determiner 182 skips the processing in Step S121 to Step S123 and advances to Step S124.

The authentication determiner 182 transmits the mean value of authentication values of the face determined in Step S121 to the authentication information updater 184. The authentication information updater 184 compares the received mean value of authentication values of the face with a preset upper limit of the authentication threshold value. When the mean value of authentication values of the face is equal to or greater than the preset upper limit of the authentication threshold value, the authentication information updater 184 updates the authentication threshold value associated with "face" out of the biometric information types in the table in the authentication biometric information database 171 illustrated in FIG. 6A by writing the upper limit of the authentication threshold value into the authentication threshold value. Further, when the mean value of authentication values of the face is equal to or less than the preset upper limit of the authentication threshold value, the authentication information updater 184 updates the authentication threshold value associated with "face" out of the biometric information types in the table in the authentication biometric information database 171 illustrated in FIG. 6A by writing the mean value of authentication values of the face determined in Step S121 into the authentication threshold value (Step S122).

Next, the authentication information updater 184 updates the allowable authentication value (Step S123). Specifically, when the mean value of authentication values of the face determined in Step S121 is equal to or greater than the preset upper limit of the authentication threshold value, the authentication information updater 184 sets a preset maximum allowable authentication value to the allowable authentication value. Further, when the mean value of authentication values of the face determined in Step S121 is equal to or less than the preset upper limit of the authentication threshold value, and a value acquired by adding the mean value of authentication values of the face determined in Step S121 and a default allowable authentication range value is equal to or less than the maximum allowable authentication value, the added value is set to the allowable authentication value.

When the value acquired by adding the mean value of authentication values of the face determined in Step S121 and the default allowable authentication range value is equal to or greater than the maximum allowable authentication value, the maximum allowable authentication value is set to the allowable authentication value. The authentication information updater 184 acquires the authentication biometric information database 171 illustrated in FIG. 3 from the authentication apparatus storage 17. The authentication information updater 184 updates the allowable authentication value associated with "face" out of the biometric information types in the table in the authentication biometric information database 171 illustrated in FIG. 6A by writing the determined allowable authentication value into the allowable authentication value associated with "face."

The authentication information acquirer 181 illustrated in FIG. 5 acquires the angle of inclination of the authentication apparatus 1 from the inclination detector 13. Next, the authentication information acquirer 181 acquires current date-and-time information from an unillustrated timer (Step S124). The authentication information acquirer 181 transmits the acquired angle of inclination of the authentication apparatus 1 and the acquired current date-and-time information to the authentication determiner 182. The authentication determiner 182 transmits the received angle of inclination of the authentication apparatus 1 and the received current date-and-time information to the authentication information updater 184. The authentication information updater 184 writes the received angle of inclination of the authentication apparatus 1 and the received current date-and-time information into the inclination information table 173 stored in the authentication apparatus storage 17 illustrated in FIG. 3 and retains the angle of inclination and the current date-and-time information (Step S125).

The authentication determiner 182 acquires a standby time stored in the table in the inclination information table 173 illustrated in FIG. 6C. The authentication determiner 182 transmits the acquired standby time to the authentication information acquirer 181. The authentication information acquirer 181 stands by to acquire data from the communicator 10, the image capture device 11, and the like during the received standby time (Step S126). When the standby time ends, the authentication information acquirer 181 acquires the angle of inclination of the authentication apparatus 1 from the inclination detector 13. Next, the authentication information acquirer 181 acquires current date-and-time information from the unillustrated timer (Step S127). The authentication information acquirer 181 transmits the acquired angle of inclination of the authentication apparatus 1 and the acquired current date-and-time information to the authentication determiner 182.

The authentication determiner 182 acquires an angle of the authentication apparatus 1 stored in the table in the inclination information table 173 illustrated in FIG. 6C. The authentication determiner 182 determines whether a change in angle exists by comparing the angle of inclination of the authentication apparatus 1 received from the authentication information acquirer 181 with the angle of the authentication apparatus 1 acquired from the inclination information table 173 (Step S128). When the change in the angle of the authentication apparatus 1 is not less than a preset angle value such as 30 degrees (Step S128: NO), the authentication determiner 182 determines that the authentication apparatus 1 has been moved and has undergone some operation by the user and returns to Step S101 described in FIG. 11A. Subsequently, the authentication determiner 182 executes the processing in and after Step S101.

Further, when the change in the angle of the authentication apparatus 1 is equal to or less than the preset angle value (Step S128: YES), the authentication determiner 182 determines that the authentication apparatus 1 has not been moved by the user. Next, the authentication determiner 182 determines whether a timing for authenticating the user has arrived (Step S129). The timing for authenticating the user refers to a timing when a preset authentication interval of time elapses. When the timing for authenticating the user has arrived (Step S129: YES), the authentication determiner 182 returns to Step S101 described in in FIG. 11A. Subsequently, the authentication determiner 182 executes the processing in and after Step S101. When the timing for authenticating the user has not arrived (Step S129: NO), the authentication determiner 182 returns to Step S125. The authentication determiner 182 executes the processing in Step S125 to Step S129.

When an authentication value determined from biometric information and the authentication threshold value take the same value in the aforementioned embodiment, whether the authentication is successful may be determined either in a case of the authentication value determined from the biometric information being equal to or less than the authentication threshold value or in a case of the authentication value determined from the biometric information being equal to or greater than the authentication threshold value. Further, when an authentication value determined from biometric information and the allowable authentication value take the same value, whether the authentication is successful may be determined either in a case of the authentication value determined from the biometric information being equal to or less than the allowable authentication value or in a case of the authentication value determined from the biometric information being equal to or greater than the allowable authentication value.

Figure 12:
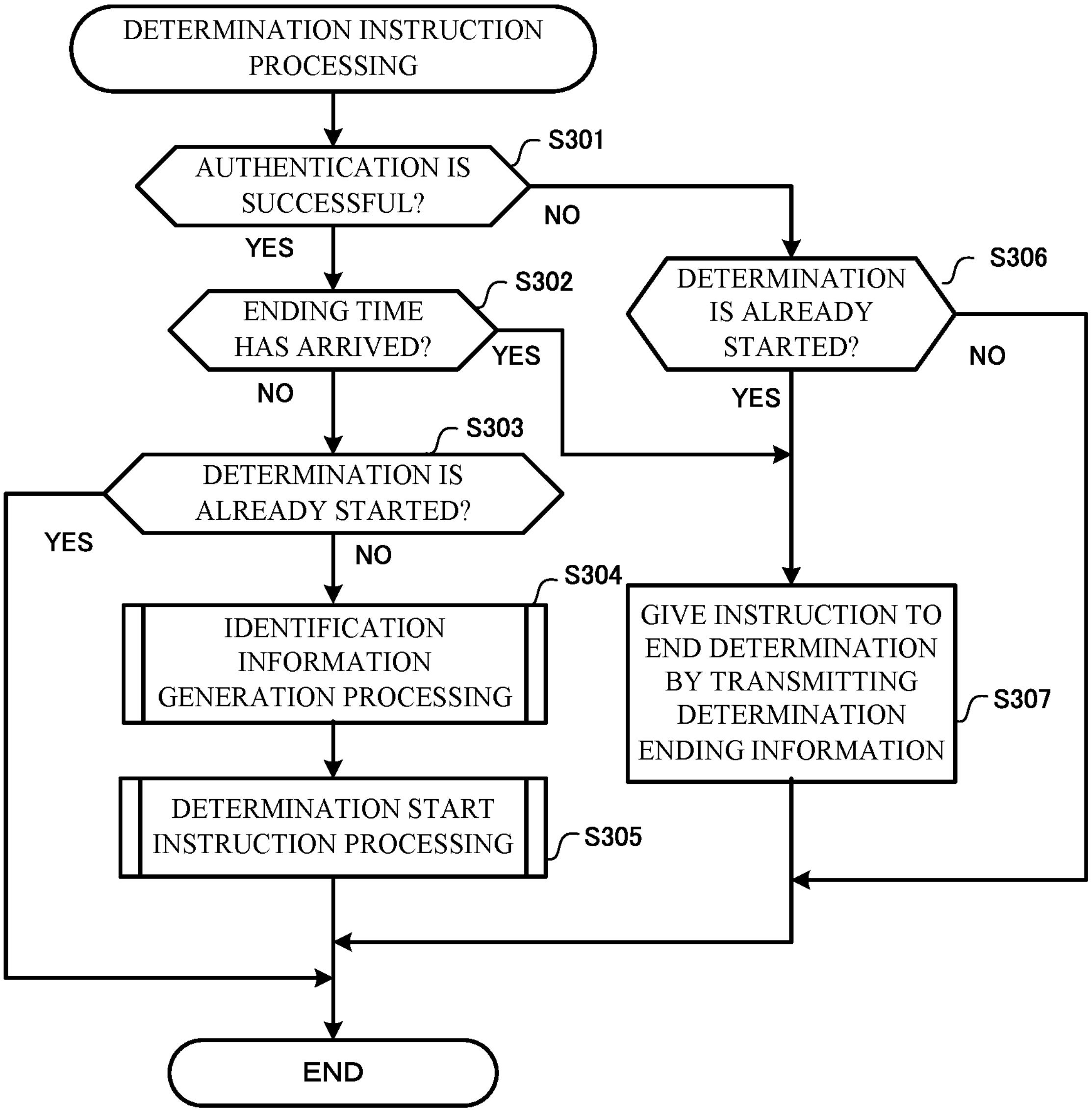
FIG. 12 is a flowchart illustrating an example of determination instruction processing.

Next, the determination instruction processing is described referring to FIG. 12. FIG. 12 is a flowchart illustrating an example of the determination instruction processing. The determination instruction processing has only to start every time the authentication processing ends; and every time the authentication processing is repeated for every set period, the determination instruction processing is also repeatedly executed. Since the authentication processing according to the present embodiment is continuously and repeatedly executed while an application for a financing service (an application of a so-called internet banking) is running (from when the application is started until when the application is ended), the determination instruction processing is also repeatedly executed for the same period. When the determination instruction processing is started, the processing device 187 determines whether authentication in the authentication processing is successful (Step S301).

When the authentication is determined to be successful (Step S301: YES), the processing device 187 determines whether the processing is completed (Step S302). Specifically, in Step S302, the processing device 187 determines whether the processing is completed by, for example, determining whether an application for a financing service (an application of a so-called internet banking) is ended by an input operation on the operation input device 14 by the user, or determining, by checking a timer value, whether a predetermined period has elapsed since the application for the financing service is started.

When the processing is not determined to be completed (Step S302: NO), the processing device 187 determines whether the processing in Step S305 is already executed and determination is already started (Step S303). In Step S303, the processing device 187 may determine whether determination is already started by determining whether the processing in Step S305 to be described below is already executed. When determination is already started (Step S303: YES), the processing device 187 directly ends the determination instruction processing. On the other hand, when determination is not already started (Step S303: NO), the processing device 187 causes the identification information generator 186 to execute the identification information generation processing of generating identification information (Step S304).

Figure 13A:
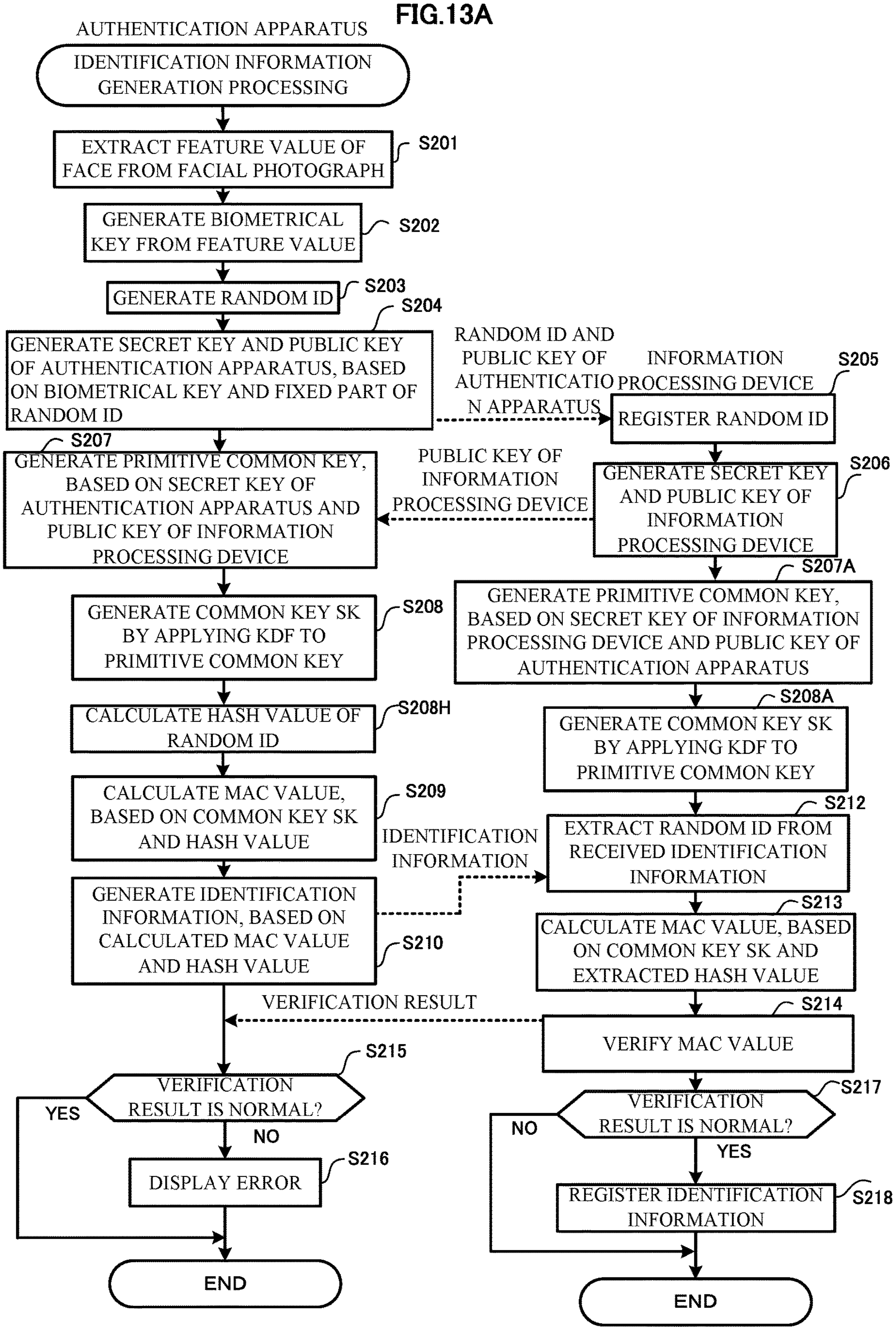
FIG. 13A is a flowchart illustrating an example of identification information generation processing.

FIG. 13A is a flowchart illustrating an example of the identification information generation processing executed in Step S304 in FIG. 12. In the identification information generation processing illustrated in FIG. 13A, the identification information generator 186 first extracts a feature value of the face from the facial photograph acquired in Step S101 described in FIG. 11A (Step S201). A facial photograph of the user may be newly taken in the processing in Step S201; and in this case, whether the photograph is blurred may be determined and a retry may be performed when the photograph is blurred, similarly to the processing in Step S102 described in FIG. 11A. Further, in the processing in Step S201 described in FIG. 13A, the feature value determined when YES is determined in the processing in Step S104 described in FIG. 11A may be used. Although the feature value of the face is extracted in Step S201, the feature value is not limited to that extracted from the face and may be extracted from biometric information of the user, and the biometric information may be a fingerprint, a voiceprint, an iris, or the like, or combination thereof.

Next, the identification information generator 186 generates a biometrical key from the extracted feature value (Step S202). For example, in Step S202, a biometrical key is generated based on the feature value of the face extracted in the processing in Step S201, by using a key derivation function called a biometric-based key derivation function (BB-KDF). The key derivation function corresponds to a predetermined one-way function. While an example of generating a biometrical key, based on the feature value of the face extracted in the processing in Step S201 has been described in the processing in Step S202 in the present embodiment, for example, a feature value of a voiceprint or a fingerprint may be extracted in Step S201 and a biometrical key may be generated based on the feature value in Step S202. Further, a biometrical key may be generated based on a plurality of feature values of the face, a voiceprint, a fingerprint, and the like. The feature value of the face extracted in Step S201 and feature values of a voiceprint and a fingerprint correspond to biometric information of the user. Further, a biometrical key corresponds to a biometric key, and the identification information generator 186 executing the processing in Step S202 and the processing in Step S202 correspond to biometric key generation means and a biometric key generation step, respectively.

For example, in the processing in Step S202, a biometrical key may be generated from the feature value extracted in Step S201 and supplementary data. While biometrical keys generated based on feature values of the same person are basically identical, there may be an event in which the keys are not identical; and data set for avoiding such an event are supplementary data. Specifically, the supplementary data are data supplementing feature values of biometric data in such a way that identical biometrical keys are generated for the same person when feature values of the biometric data have deviation. The supplementary data may be previously generated according to an amount of deviation in feature values of biometric data.

Next, the identification information generator 186 generates a random ID being randomly generated 128-bit data (Step S203). For example, a random ID may be generated by using a universal unique identifier (UUID) in the processing in Step S203. The random ID is a 128-bit data and consists of an 80-bit fixed part and a 48-bit variable part. Note that the numbers of bits of the fixed part and the variable part are an example, and the random ID may be configured in any manner as long as a portion of the random ID is a fixed part and the remainder is a variable part. Alternatively, the variable part may be a portion of bit data other than the fixed part (all of bit data other than the fixed part does not have to constitute the variable part). The random ID generated in the processing in Step S203 corresponds to random information.

After executing the processing in Step S203, the identification information generator 186 generates a secret key and a public key of the authentication apparatus (a pair key including an authentication apparatus secret key and an authentication apparatus public key), based on the biometrical key generated in Step S202 and the fixed part of the random ID generated in Step S203 (Step S204). In Step S204, the secret key and the public key of the authentication apparatus are generated in accordance with a previously stored pair key generation program, based on the biometrical key and the fixed part of the random ID. The random ID generated in Step S203 and the public key of the authentication apparatus generated in Step S204 are transmitted to the information processing device 7 through the communicator 10. While details are described later, since the secret key and the public key of the authentication apparatus are generated using the fixed part of the random ID in the processing in Step S204, even if the variable part is modified, the secret key and the public key of the authentication apparatus remain unmodified. Note that when the random ID and the public key of the authentication apparatus are transmitted, information input by the user, such as a nickname, a password, and/or an e-mail address is also transmitted together.

On the information processing device 7 side, when receiving the random ID and the public key of the authentication apparatus from the authentication apparatus 1, the random ID is registered into the information processing device storage 77 (Step S205). Specifically, the random ID is stored in the information processing device storage 77 in association with information of the user such as a nickname, a password, and/or an e-mail address. While details are described later (see FIG. 15), the random ID that has been registered in Step S205 in association with the nickname of the user is used when the authentication apparatus 1 is replaced with a new one in such a case where the user has lost the authentication apparatus 1.

After executing the processing in Step S205, the processing device 787 in the information processing device 7 generates a secret key and a public key of the information processing device (Step S206). In Step S206, the secret key and the public key of the information processing device are generated in accordance with a previously stored pair key generation program. The public key of the information processing device generated in Step S206 is transmitted to the authentication apparatus 1 through the communicator 70. The communicator 10 of the authentication apparatus 1 that receives the public key of the information processing device generated in Step S206 and the processing of receiving the public key respectively correspond to public key acquisition means and a public key acquisition step, respectively. In addition, the processing device 787 that executes the processing in Step S206 corresponds to pair key generation means.

Specifically, on the authentication apparatus 1 side, the identification information generator 186 generates a primitive common key, based on the secret key of the authentication apparatus and the received public key of the information processing device (Step S207). On the other hand, on the information processing device 7 side, the processing device 787 generates a primitive common key, based on the secret key of the information processing device and the received public key of the authentication apparatus (Step S207A). The primitive common keys are identical keys, according to the Diffie-Helman key exchange method.

Next, on the authentication apparatus 1 side, the identification information generator 186 generates the common key SK by applying the key derivation function (KDF) to the primitive common key (Step S208); and on the information processing device 7 side, the processing device 787 similarly generates the common key SK by applying the KDF to the primitive common key (Step S208A). Thus, the common key SK being common between the authentication apparatus 1 and the information processing device 7 is generated. As described above, since the secret key and the public key of the authentication apparatus are generated using the fixed part of the random ID in the processing in Step S204, even if the variable part of the random ID is modified, the secret key and the public key of the authentication apparatus remain unmodified. Therefore, when the variable part of the random ID is modified, the common key SK also remains unmodified. The identification information generator 186 executing the processing in Step S204, the processing in Step S207, and the processing in Step S208, and the processing in Step S204, the processing in Step S207, and the processing in Step S208 correspond to common key generation means and a common key generation step, respectively.

On the authentication apparatus 1 side, after executing the processing in Step S208, the identification information generator 186 calculates a hash value of the random ID (containing the fixed part and the variable part) generated in the processing in Step S203 (Step S208H). After executing the processing in Step S208H, the identification information generator 186 calculates a message authentication code (MAC) value, based on the common key SK generated in the processing in Step S208 and the hash value calculated in the processing in Step S208H (Step S209). In Step S209, a MAC value based on the common key SK and the hash value is calculated by a MAC algorithm.

After executing the processing in Step S209, the identification information generator 186 generates identification information, based on the calculated MAC value and the hash value (Step S210). Specifically, in Step S210, 320-bit data including a footer are generated by adding the calculated MAC value to the hash value, and the generated data are set as identification information. The identification information generated in Step S210 is transmitted to the information processing device 7 through the communicator 10. The identification information generator 186 executing the processing in Step S210 and the processing in Step S210 correspond to identification information generation means and an identification information generation step, respectively. The identification information may be encrypted by a preset encryption method and then be transmitted to the information processing device 7.

On the information processing device 7 side, when receiving the identification information, the processing device 787 extracts a hash value from the received identification information (Step S212). Next, the processing device 787 calculates a MAC value, based on the common key SK generated in Step S208A and the hash value extracted in Step S212 (Step S213).

After executing the processing in Step S213, the processing device 787 verifies the MAC value calculated in Step S213 (Step S214). Specifically, in Step S214, verification is performed by checking whether the MAC value calculated in Step S213 matches the MAC value included in the received identification information. The verification result in the processing in Step S214 is transmitted to the authentication apparatus 1 through the communicator 70.

On the authentication apparatus 1 side, the identification information generator 186 determines whether the received verification result is normal (Step S215) and when the verification result is normal (Step S215: YES), directly ends the identification information generation processing. On the other hand, when the verification result is not normal (Step S215: NO), the identification information generator 186 displays an error (Step S216) and then ends the identification information generation processing. In Step S216, display for prompting re-execution may be performed, or the identification information generation processing may be manually caused to be executable again.

On the other hand, the processing device 787 on the information processing device 7 side also determines whether the verification result in Step S214 is normal (Step S217). When the verification result is not normal (Step S217: NO), the processing device 787 directly ends the identification information generation processing. In this case, unsuccessful registration of identification information may be notified to the authentication apparatus 1 through the communicator 70; and, on the authentication apparatus 1 side, an error may be displayed and then the identification information generation processing may be manually caused to be executable again.

Further, when the verification result in Step S214 is normal (Step S217: YES), the processing device 787 registers the received identification information and the like by storing the identification information in association with the public key of the authentication apparatus into the information processing device storage 77 (Step S218) and ends the identification information generation processing. In Step S218, the processing device 787 associates the received identification information with the public key of the authentication apparatus and then stores the information into the information processing device storage 77 as the associated information list 771 illustrated in FIG. 10. In other words, the processing in Step S218 may be considered as processing of generating and registering the associated information list 771 illustrated in FIG. 10.

Thus, by execution of the identification information generation processing illustrated in FIG. 13A, identification information for determining a user for whom a service is provided is valid. Further, by execution of the identification information generation processing, identification information is registered on the information processing device 7 side, in other words, the reference information list 771 illustrated in FIG. 10A is registered on the information processing device 7 side, and therefore user identification is thereafter enabled by identification information. Further, identification information is information generated based on biometric information of a user but is not the biometric information itself, and it is impossible to generate the biometric information from the identification information. Therefore, improper acquisition of biometric information itself can be prevented, and security can be ensured. Further, since a random ID is randomly generated, a plurality of pieces of identification information can be generated from the same biometric information (the same feature value of a face), and therefore a user workload can be lightened with ensured security, and, by extension, the user can stably receive a service. An example of executing the identification information generation processing illustrated in FIG. 13A in the determination instruction processing illustrated in FIG. 12 is described in the present embodiment, and the determination instruction processing is started every time the authentication processing is ended, and therefore the identification information generation processing is also repeatedly executed; however, the identification information generation processing may be executed once for each provided service (or for each information processing device 7) for a target user. In other words, after the identification information is generated once for a service to be provided, the identification information generation processing is not executed again, and only when a different service is to be provided, the identification information generation processing may be executed for the different service. Subsequently, the update processing to be described below may be executed. While details are to be described later, in the present embodiment, execution of the update processing enables the generated identification information to be updated.

Returning to FIG. 12, after executing the processing in Step S304, the processing device 187 executes the determination start instruction processing in which validity of a user is determined and an instruction to start a service is given (Step S305), and ends the determination instruction processing. By the instruction to start determination in the processing in Step S305, the information processing device 7 determines that a user is valid. When the information processing device 7 determines that the user is valid by using the identification information, an instruction to start a service is given to the financial institution 99. As described above, when the financial institution 99 verifies validity of the login information, the transfer processing is performed. Therefore, the processing device 187 executing the processing in Step S305 and the processing in Step S305 correspond to determination instruction means and determination instruction step, respectively.

Figure 13B:
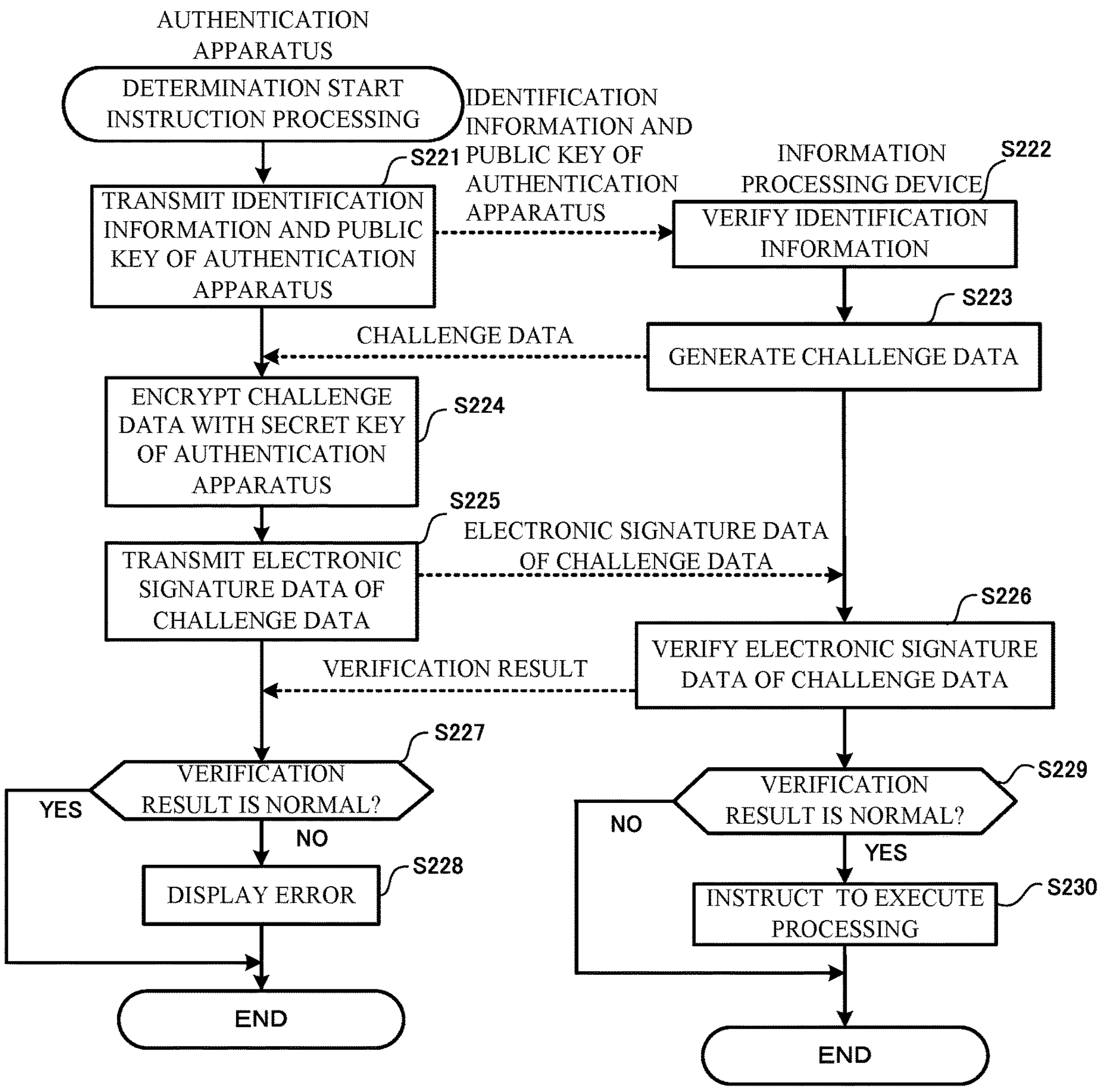
FIG. 13B is a flowchart illustrating an example of determination start instruction processing.

FIG. 13B is a flowchart illustrating an example of the determination start instruction processing executed in Step S305 in FIG. 12. In the determination start instruction processing illustrated in FIG. 13B, the processing device 187 in the authentication apparatus 1 transmits identification information and the public key of the authentication apparatus to the information processing device 7 through the communicator 10 (Step S221). Although illustration is omitted in the processing in Step S221, the login information such as the login ID and the password issued by the financial institution 99 is also transmitted together.

On the information processing device 7 side, the processing device 787 verifies the received identification information (Step S222). Note that the communicator 70 that receives the identification information from the authentication apparatus 1 corresponds to identification information acquisition means. In Step S222, the processing device 787 verifies the identification information by executing the processing in Step S207A, the processing in Step S208, and the processing in Steps S202 to S214 illustrated in FIG. 13A. In Step S222, the identification information may be verified, for example, by referring to the associated information list 771 stored in the information processing device storage 77 to verify correspondence relation between the public key of the authentication apparatus and the identification information that have been received. When the verification is not normal in the processing in Step S222, the processing may be ended. The processing device 787 that executes the processing in Step S222 corresponds to determination means. After executing the processing in Step S222, in other words, when the verification result is normal, the processing device 787 generates challenge data (Step S223). The generated challenge data are transmitted to the authentication apparatus 1 through the communicator 70. Thus, the identification information is transmitted to the information processing device 7 in the processing in Step S221; and when verification of the identification information is normal, the challenge-response authentication is performed. Therefore, the processing in Step S221 may be considered as processing of giving an instruction to perform authentication for providing a service related to a target user.

On the authentication apparatus 1 side, the processing device 187 electronically signs the received challenge data using the secret key of the authentication apparatus (Step S224) and transmits the electronic signature data of the challenge data to the information processing device 7 through the communicator 10 (Step S225).

Next, on the information processing device 7 side, the processing device 787 verifies the electronic signature data of the challenge data using the public key of the authentication apparatus (Step S226). Specifically, in Step S226, the processing device 787 performs verification by checking whether the received electronic signature data of the challenge data are identical with the electronic signature data that can be generated only by using a secret key paired with the public key of the authentication apparatus of the challenge data that has been generated in Step S223. The verification result is transmitted to the authentication apparatus 1 through the communicator 70.

On the authentication apparatus 1 side, the processing device 187 determines whether the received verification result is normal (Step S227) and when the verification result is normal (Step S227: YES), directly ends the determination start instruction processing. On the other hand, when the verification result is not normal (Step S227: NO), the processing device 187 displays an error (Step S228) and then ends the determination start instruction processing. In Step S228, display for prompting re-execution may be performed, or the determination start instruction processing may be manually caused to be executable again.

On the other hand, the processing device 787 on the information processing device 7 side also determines whether the verification result in Step S226 is normal (Step S229). When the verification result is not normal (Step S229: NO), the processing device 787 directly ends the determination start instruction processing. In this case, an unsuccessful start of the service, that is, an unsuccessful start of determination may be notified to the authentication apparatus 1 through the communicator 70; and, on the authentication apparatus 1 side, an error may be displayed, and the determination start instruction processing may be manually caused to be executable.

Further, when the verification result in Step S229 is normal (Step S229: YES), the processing device 787 transmits instruction information for instructing the financial institution 99 to execute the processing (Step S230) and ends the determination start instruction processing. In this example, by execution of the processing in Step S230, execution of the transfer processing is instructed. In the processing in Step S230, in addition to the instruction information, the login information is transmitted and the financial institution 99 determines validity of the login information. When the validity of the login information is verified, the transfer processing is executed. The processing device 787 executing the processing in Step S230 corresponds to service provision instruction means.

Thus, by execution of the determination start instruction processing illustrated in FIG. 13B, verification of identification information is performed and service provision is started. As described above, identification information is information generated based on biometric information of a user but is not the biometric information itself; and it is impossible to generate the biometric information from the identification information. Therefore, improper acquisition of biometric information itself can be prevented and security can be ensured. In the present embodiment, the determination start instruction processing illustrated in FIG. 13B is executed in the determination instruction processing illustrated in FIG. 12. The determination instruction processing is started every time the authentication processing is ended, and therefore the determination start instruction processing is also repeatedly executed; however, once the determination processing is executed (once the service is started), YES is determined in Step S303 described in FIG. 12, and the determination start instruction processing is not executed again.

Returning to FIG. 12, when determining that the authentication is unsuccessful in Step S301 (Step S301: NO), the processing device 187 determines whether the processing in Step S305 is already executed and an instruction to start determination is given, similarly to Step S303 (Step S306). When determination is not already started (Step S306: NO), the processing device 187 directly ends the determination instruction processing. On the other hand, when determination is already started (Step S306: YES) or when the processing device 187 determines that the processing is completed in Step S302 (Step S302: YES), the processing device 187 gives an instruction to end the processing by transmitting determination ending information to the information processing device 7 (Step S307) and ends the determination instruction processing. When the information processing device 7 receives the determination ending information, for example, at a timing before the processing in Step S230 illustrated in FIG. 13B is executed, the information processing device 7 does not execute the processing in Step S230 and ends the processing being executed. On the other hand, when the information processing device 7 receives the determination completion information at a timing after the processing in Step S230 is executed, the information processing device 7 transmits, to the financial institution 99, cancellation instruction information for instructing cancellation of the transfer processing. When transmitting the cancellation instruction information, the login information may be transmitted together.

Specifically, YES in determination in Step S306 indicates that authentication is unsuccessful due to substitution with another person (for example, a blackmailer) or the like in spite of determination of validity of a user being already started using the identification information. In this case, a situation in which a transfer is performed by blackmail or spoofing can be prevented by giving an instruction to end the determination in the processing in Step S307 and forcibly ending the transfer processing. Further, when the ending time has arrived (YES is determined in Step S302), the transfer processing is also ended, and therefore an erroneous determination, making determination of the identification information and giving an instruction to the financial institution 99 in spite of the processing being ended, can be prevented by synchronization between the authentication apparatus 1 and the information processing device 7.

Figure 14:
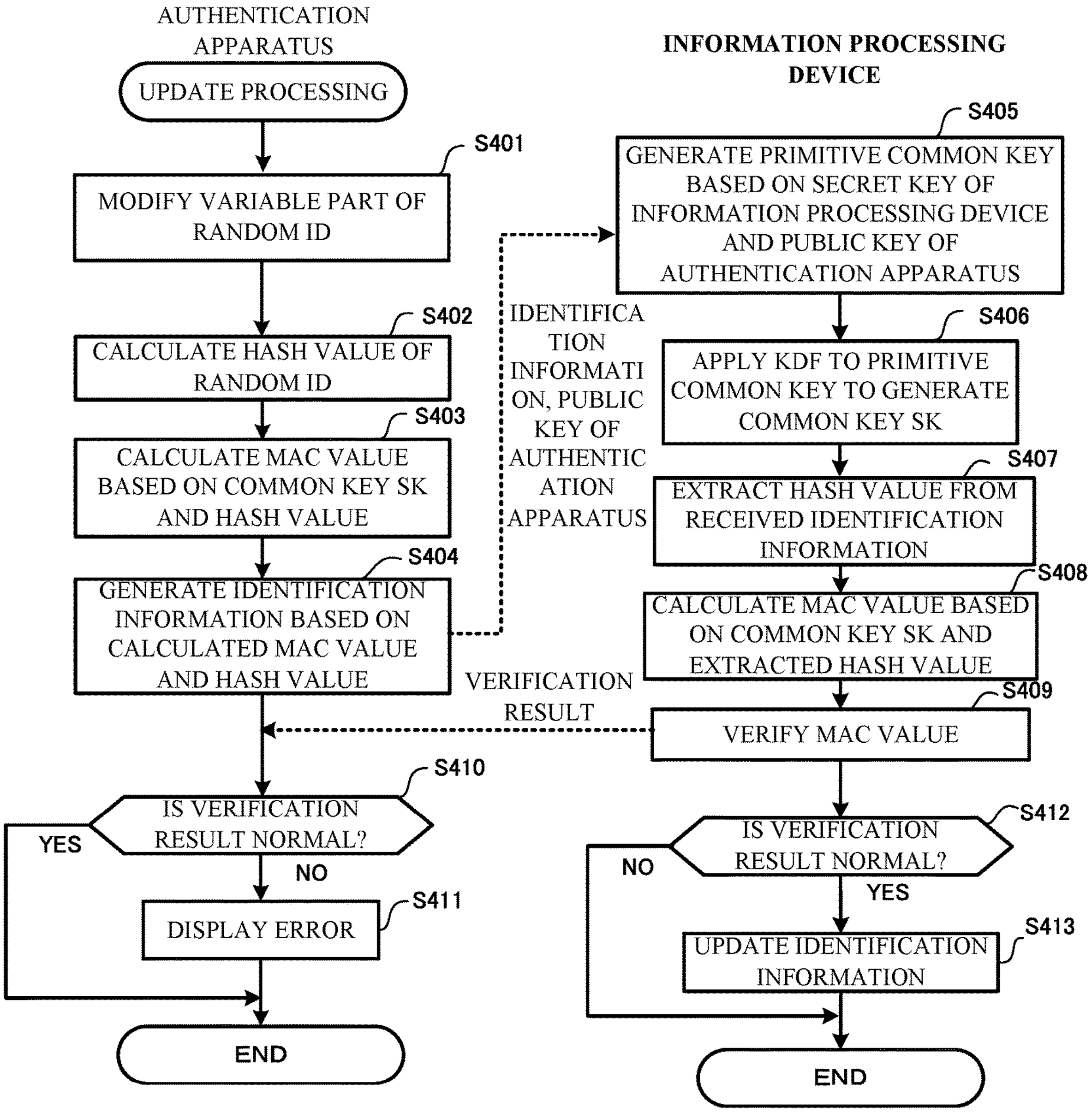
FIG. 14 is a flowchart illustrating an example of update processing.

Next, the update processing of updating the identification information generated by executing the identification information generation processing is described referring to FIG. 14. The update processing according to the present embodiment is executed when a predetermined period such as half a year or a year elapses. In addition, the update processing may be executed at a timing when processing is executed the preset number of times, for example, when the transfer processing is executed 10 times. A condition for executing the update processing, such as an elapsed time or the number of executions, corresponds to a second condition. The identification information generator 186 that executes the update processing and the update processing illustrated in FIG. 14 correspond to updating means and an updating step, respectively.

The update processing may be performed at a timing when there is a change in behavior, a custom, a habit, or the like of a user, such as an increase in the number of withdrawals. Whether there is a change in the behavior, the custom, the habit, or the like of the user may be determined by generating statistical information based on information acquired from various types of sensors installed in the authentication apparatus 1 and periodically comparing the statistical information with a predetermined criterion. In the processing in Step S201 in FIG. 13A, an example in which the feature value of the face is extracted is illustrated; however, information such as the behavior, the custom, the habit, or the like of the user may be involved in addition to the face in execution of the processing in Step S202. In this case, the biometrical key in Step S202 changes due to a change in the behavior, the custom, or the habit of the user. Therefore, when there is a change in the behavior, the custom, or the habit of the user as just described, the identification information generation processing, not the update processing, may be executed again to update the identification information.

In the update processing illustrated in FIG. 14, the identification information generator 186 modifies the variable part of the random ID generated in the processing in Step S203 in FIG. 13A (Step S401). Specifically, in the processing in Step S401, the identification information generator 186 modifies the variable part of the random ID generated in the processing in Step S203 in FIG. 13A by adding +1 to the variable part of the random ID. In this example, an example in which +1 is added to the variable part of the random ID is described; however, this is merely an example and any modification method may be employed as long as the variable part of the random ID is modified to be different from the variable part of the random ID generated in the processing in Step S203 in FIG. 13A.

After executing the processing in Step S401, the identification information generator 186 calculates a hash value of the random ID (Step S402). In the processing in Step S402, the identification information generator 186 combines the variable part of the random ID modified in the processing in Step S401 with the fixed part of the random ID generated in the processing in Step S203 in FIG. 13A, and calculates a hash value of the resultant random ID.

After executing the processing in Step S402, the identification information generator 186 calculates a MAC value based on the common key SK generated in the processing in Step S208 in FIG. 13A and the hash value calculated in Step S402 in FIG. 14 (Step S403). In Step S403, the identification information generator 186 calculates the MAC value based on the common key SK and the hash value by means of a MAC algorithm, similarly to the processing in Step S209 illustrated in FIG. 13A.

After executing the processing in Step S403 illustrated in FIG. 14, the identification information generator 186 generates identification information based on the calculated MAC value and the hash value (Step S404). Specifically, in Step S404, 320-bit data including a footer are generated by appending the calculated MAC value to the hash value, and the resultant data are defined as the identification information. The identification information generated in Step S404 is transmitted to the information processing device 7 through the communicator 10 together with the public key of the authentication apparatus generated in Step S204 in FIG. 13A. The identification information and the public key of the authentication apparatus may be transmitted to the information processing device 7 after encryption by means of a preselected encryption scheme.

The identification information is generated using the hash value of whole of the random ID containing the fixed part and the variable part. Therefore, in the processing in Step S401, modification of the variable part of the random ID causes contents of the identification information generated in the processing in Step S404 to be different from those of the identification information generated in Step S210 in FIG. 13A.

When the information processing device 7 receives the identification information, the processing device 787 generates a primitive common key based on the secret key of the information processing device generated in Step S206 in FIG. 13A and the received public key of the authentication apparatus (Step S405). After executing the processing in Step S405, the processing device 787 applies the KDF to the primitive common key to generate a common key SK (Step S406). As described above, the secret key of the authentication apparatus is generated using the fixed part of the random ID, and the fixed part of the random ID is not modified in the update processing. As a result, the common key SK generated in Step S406 is identical with the common key SK generated in Step S208A in FIG. 13A. Therefore, for example, at a timing of generating the common key SK in the processing in Step S406, validity of the update processing, that is, validity of an update request made this time may be verified by verifying whether the MAC value based on the generated common key SK and the hash value of the random ID stored in the information processing device storage 77 before update matches the MAC value in the identification information stored in the information processing device storage 77 before update.

After executing the processing in Step S406, the processing device 787 extracts the hash value from the received identification information (Step S407). Next, the processing device 787 calculates a MAC value based on the common key SK generated in Step S406 and the hash value extracted in Step S407 (Step S408).

After executing the processing in Step S408, the processing device 787 verifies the MAC value calculated in Step S408 (Step S409). Specifically, in Step S409, the processing device 787 performs verification by checking whether the MAC value calculated in Step S408 matches the MAC value contained in the received identification information. The verification result in the processing in Step S409 is transmitted to the authentication apparatus 1 through the communicator 70.

On the authentication apparatus 1 side, the identification information generator 186 determines whether the received verification result is normal (Step S410), and when the verification result is normal (Step S410: YES), the identification information generator 186 directly ends the update processing. On the other hand, when the verification result is not normal (Step S410: NO), the identification information generator 186 displays an error (Step S411) and ends the update processing. In Step S411, display for prompting re-execution of the update processing may be performed, and the update processing may be configured to be manually executed again.

On the other hand, the processing device 787 on the information processing device 7 side also determines whether the verification result in Step S409 is normal (Step S412). When the verification result is not normal (Step S412: NO), the processing device 787 directly ends the update processing. In this case, the update processing may be configured to be manually executed again after update of the identification information being unsuccessful is notified to the authentication apparatus 1 through the communicator 70 and the authentication apparatus 1 displays an error.

When the verification result in Step S409 is normal (Step S412: YES), the processing device 787 updates the identification information by replacing the identification information stored in association with the received public key of the authentication apparatus in the information processing device storage 77 with the received identification information (Step S413), and ends the update processing. In Step S413, identification information associated with the received public key of the authentication apparatus in one or more pieces of the identification information contained in the associated information list 771 illustrated in FIG. 10 is changed to the received identification information. In other words, the processing in Step S413 may be considered as processing of updating the associated information list 771 illustrated in FIG. 10. When the information processing device 7 receives the identification information, the information processing device 7 may receive the random ID together, and when updating the identification information in the processing in Step S413, the information processing device 7 may also update the random ID stored in the information processing device storage 77 in association with information of the user such as a nickname, a password, and/or an e-mail address. Note that the variable part is modified in the received random ID. Therefore, for example, the information processing device 7 may receive whole of 128-bit data, identify a random ID the fixed part of which is identical with the received random ID, and update the random ID in the processing in Step S413. Further, for example, the received random ID may only contain the variable part modified in Step S401. In this case, the information processing device 7 may receive information of the user such as a nickname, a password, and/or an e-mail address together with information of the variable part, identify a random ID stored in the information processing device storage 77 in association with the information of the nickname, the password, and/or the e-mail address, and update the random ID.

In the update processing illustrated in FIG. 14, an example in which the processing in Step S405 and the processing in Step S406 are executed for generating the common key SK is described; however, if the common key SK corresponding to the received public key of the authentication apparatus can be identified, the processing in Step S405 and the processing in Step S406 do not have to be executed. For example, the public key of the authentication apparatus may be stored in association with the common key SK generated in the processing in Step S208A in the associated information list 771, and the processing in Step S408 may be executed by identifying a common key SK based on the received public key of the authentication apparatus and using the identified common key SK.

In this manner, by partitioning the random ID into the fixed part and the variable part and modifying only the variable part, the identification information can be updated without re-executing the identification information generation processing, and processing load can be lightened. In addition, only the variable part of the random ID may be modified by the authentication apparatus 1 and the information processing device 7 can update the identification information based on existing information such as the public key of the authentication apparatus, which enables the update processing to be performed without complicating the processing. Even when the identification information has been updated, the information processing device 7 can determine validity of the identification information by executing the processing in Step S222 illustrated in FIG. 13B, similarly to the processing before the update. In other words, validity of the identification information can be determined by means of common processing before and after the update.

Figure 15:
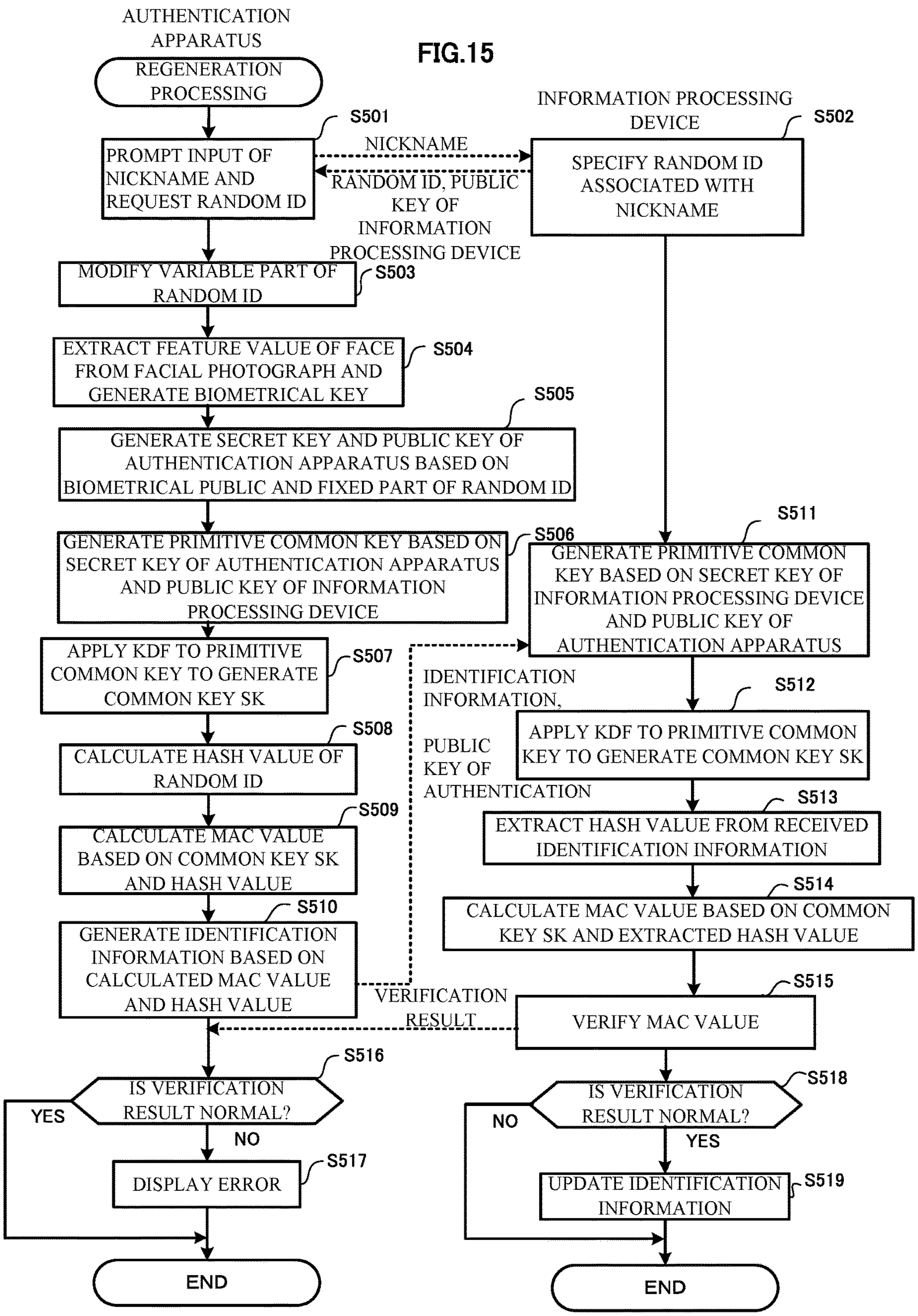
FIG. 15 is a flowchart illustrating an example of regeneration processing.

Next, regeneration processing of regenerating the identification information in a case where the user replaces the authentication apparatus 1 with a new one, for example, when the user loses the authentication apparatus 1, is described referring to FIG. 15. It is assumed that the identification information generation processing illustrated in FIG. 13A has been already executed by the previous authentication apparatus 1 before it is replaced with the new one and the identification information is already registered in the information processing device 7. The identification information generator 186 that executes the identification information regeneration processing illustrated in FIG. 15 corresponds to regeneration means.

When the regeneration processing illustrated in FIG. 15 is started, the identification information generator 186 first prompts the user to input a nickname, transmits the input nickname to the information processing device 7, and requests the random ID (Step S501). Note that as described above, the random ID may be requested by means of a different method, for example, by prompting the user to input information of the user other than the nickname, such as a password or an e-mail address. When the information processing device 7 receives the nickname, the information processing device 7 identifies a random ID associated with the received nickname among the random IDs registered in association with nicknames in Step S205 in FIG. 13A (Step S502), and transmits the identified random ID to the authentication apparatus 1. Note that the public key of the information processing device is transmitted to the authentication apparatus 1 together with the random ID. In the processing in Step S502, the random ID does not have to be the whole of the 128-bit random ID as long as at least the 80-bit fixed part is contained. When only the fixed part (not the whole of the 128-bit data) is received, any bit data may be allocated to the variable part in the processing in Step S503.

Next, the identification information generator 186 of the authentication apparatus 1 modifies the variable part of the random ID received from the information processing device 7 (Step S503). Specifically, in the processing in Step S503, the identification information generator 186 modifies the variable part of the received random ID by adding +1 to the variable part of the random ID. Note that any modification method may be employed as long as the variable part of the random ID is modified to be different from that of the received random ID. In this example, the processing in Step S503 is executed to make the previously generated identification information unusable; however, the processing in Step S503 does not have to be executed when the previously generated identification information is used as it is. The user may be allowed to select whether to use the previously generated identification information or update the identification information, and the processing in Step S503 may be executed when update of the identification information is selected.

After executing the processing in Step S503, the identification information generator 186 extracts a feature value of the face from the facial photograph acquired in Step S101 illustrated in FIG. 11A and generates a biometrical key from the extracted feature value (Step S504). A facial photograph of the user may be newly taken in the processing in Step S504; in this case, similarly to the processing in Step S102 illustrated in FIG. 11A, whether the photograph is blurred may be determined and a retry may be performed when the photograph is blurred. Although the feature value of the face is extracted in Step S504, the feature value is not limited to that extracted from the face and may be extracted from biometric information of the user, and the biometric information may be a fingerprint, a voiceprint, an iris, or the like, or combination thereof. For example, in Step S504, a biometrical key is generated based on the feature value of the face extracted by means of a key derivation function called BB-KDF. The key derivation function corresponds to the predetermined one-way function. Although an example in which the biometrical key is generated based on the feature value of the face is described, for example, feature values of a voiceprint and a fingerprint may be extracted and the biometrical key may be generated based on one of the feature values. Further, the biometrical key may be generated based on a plurality of feature values of a face, a voiceprint, a fingerprint, and/or the like. The biometrical key generated in the processing in Step S504 is identical with the biometrical key previously generated in Step S202 as long as the user is the same person.

After executing the processing in Step S504, the identification information generator 186 generates the secret key and the public key of the authentication apparatus based on the biometrical key generated in Step S504 and the fixed part of the received random ID (Step S505). Next, the identification information generator 186 generates the primitive common key based on the secret key of the authentication apparatus and the received public key of the information processing device (Step S506). After executing the processing in Step S506, the identification information generator 186 applies the KDF to the primitive common key to generate the common key SK (Step S507). The common key SK generated in Step S507 is identical with the common key SK previously generated in Step S208.

After executing the processing in Step S507, the identification information generator 186 calculates a hash value of the random ID (Step S508). In the processing in Step S508, the identification information generator 186 combines the variable part of the random ID .modified in the processing in Step S503 with the fixed part of the received random ID, and calculates a hash value of the resultant random ID. When the processing in Step S503 is not executed, a hash value may be calculated from the received random ID itself.

After executing the processing in Step S508, the identification information generator 186 calculates a MAC value based on the common key SK generated in the processing in Step S507 and the hash value calculated in Step S508 (Step S509). In Step S509, the identification information generator 186 calculates the MAC value based on the common key SK and the hash value by means of a MAC algorithm, similarly to the processing in Step S209 illustrated in FIG. 13A.

After executing the processing in Step S509 illustrated in FIG. 15, the identification information generator 186 generates the identification information based on the calculated MAC value and the hash value (Step S510). Specifically, in Step S510, 320-bit data including a footer are generated by appending the calculated MAC value to the hash value, and the resultant data are defined as the identification information. The identification information generated in Step S510 is transmitted to the information processing device 7 through the communicator 10 together with the public key of the authentication apparatus generated in Step S506. The identification information and the public key of the authentication apparatus may be transmitted to the information processing device 7 after encryption by means of a preselected encryption scheme.

The identification information is generated using the hash value of the whole of the random ID containing the fixed part and the variable part. Therefore, in the processing in Step S503, modification of the variable part of the random ID causes contents of the identification information generated in the processing in Step S510 to be different from those of the identification information generated in Step S210 in FIG. 13A, that is, the previously generated identification information.

When the information processing device 7 receives the identification information, the processing device 787 generates the primitive common key based on the secret key of the information processing device generated in Step S206 in FIG. 13A and the received public key of the authentication apparatus (Step S511). After executing the processing in Step S511, the processing device 787 applies the KDF to the primitive common key to generate the common key SK (Step S512). As described above, the secret key of the authentication apparatus is generated using the fixed part of the random ID, and the fixed part of the random ID is not modified in the regeneration processing. As a result, the common key SK generated in Step S512 is identical with the common key SK generated in Step S208A in FIG. 13A. Therefore, for example, at a timing of generating the common key SK in the processing in Step S512, validity of the regeneration processing, that is, validity of a regeneration request made this time may be verified by verifying whether the MAC value based on the generated common key SK and the hash value of the random ID stored in the information processing device storage 77 before update matches the MAC value in the identification information stored in the information processing device storage 77 before update.

After executing the processing in Step S512, the processing device 787 extracts the hash value from the received identification information (Step S513). Next, the processing device 787 calculates a MAC value based on the common key SK generated in Step S512 and the hash value extracted in Step S513 (Step S514).

After executing the processing in Step S514, the processing device 787 verifies the MAC value calculated in Step S514 (Step S515). Specifically, in Step S515, the processing device 787 performs verification by checking whether the MAC value calculated in Step S514 matches the MAC value contained in the received identification information. The verification result in the processing in Step S515 is transmitted to the authentication apparatus 1 through the communicator 70.

On the authentication apparatus 1 side, the identification information generator 186 determines whether the received verification result is normal (Step S516), and when the verification result is normal (Step S516: YES), the identification information generator 186 directly ends the regeneration processing. On the other hand, when the verification result is not normal (Step S516: NO), the identification information generator 186 displays an error (Step S517) and ends the regeneration processing. In Step S517, display for prompting re-execution of the regeneration processing may be performed, and the regeneration processing may be configured to be manually executed again.

On the other hand, the processing device 787 on the information processing device 7 side also determines whether the verification result in Step S515 is normal (Step S518). When the verification result is not normal (Step S518: NO), the processing device 787 directly ends the regeneration processing. In this case, the regeneration processing may be configured to be manually executed again after regeneration of the identification information being unsuccessful is notified to the authentication apparatus 1 through the communicator 70 and the authentication apparatus 1 displays an error.

When the verification result in Step S515 is normal (Step S518: YES), the processing device 787 updates the identification information by replacing the identification information stored in association with the received public key of the authentication apparatus in the information processing device storage 77 with the received identification information (Step S519), and ends the regeneration processing. In Step S519, identification information associated with the received public key of the authentication apparatus in one or more pieces of the identification information contained in the associated information list 771 illustrated in FIG. 10 is changed to the received identification information. In other words, the processing in Step S519 may be considered as processing of updating the associated information list 771 illustrated in FIG. 10. When the information processing device 7 receives the identification information, the information processing device 7 may receive the random ID together, and when updating the identification information in the processing in Step S519, the information processing device 7 may also update the random ID stored in the information processing device storage 77 in association with information of the user such as a nickname, a password, and/or an e-mail address. Note that the variable part is modified in the received random ID. Therefore, for example, the information processing device 7 may receive the whole of 128-bit data, identify a random ID the fixed part of which is identical with the received random ID, and update the random ID in the processing in Step S519. Further, for example, the received random ID may only contain the variable part that has been modified in Step S503. In this case, the information processing device 7 may receive information of the user such as a nickname, a password, and/or an e-mail address together with information of the variable part, identify a random ID stored in the information processing device storage 77 in association with the information of the nickname, the password, and/or the e-mail address, and update the random ID.

In the regeneration processing illustrated in FIG. 15, an example in which the processing in Step S511 and the processing in Step S512 are executed for generating the common key SK is described; however, if the common key SK corresponding to the received public key of the authentication apparatus can be identified, the processing in Step S511 and the processing in Step S512 do not have to be executed. For example, the public key of the authentication apparatus may be stored in association with the common key SK generated in the processing in Step S208A in FIG. 13A in the associated information list 771, and the processing in Step S512 may be executed by identifying a common key SK based on the received public key of the authentication apparatus and using the identified common key SK.

In this manner, by registration of the random ID on the information processing device 7 side, the identification information can be regenerated without performing complex processing even if the user replaces the authentication apparatus 1 with a new one. In addition, without registering the biometric information itself of the user on the information processing device 7 side, regeneration of the identification information becomes possible and security can be guaranteed. Further, if the common key SK is generated by the authentication apparatus 1, the information processing device 7 can execute processing based on existing information; as a result, the identification information can be preferably regenerated while lightening processing load compared to a case where the identification information generation processing is executed again.

As described above, the authentication apparatus 1 performs user authentication in the background and when the authentication is successful, generates identification information for determining that a user is valid and transmits the identification information to the information processing device 7. Identification information is information generated based on biometric information of a user but is not biometric information itself, and it is impossible to generate the biometric information from the identification information. Therefore improper acquisition of biometric information itself can be prevented, and security can be ensured. In addition, since a random ID is randomly generated, a plurality of pieces of identification information can be generated from the same biometric information (the same feature value of the face); and therefore a user workload can be lightened with ensured security, and, by extension, the user can stably receive a service.

Further, when a verification result of identification information is normal, the identification information is registered on the information processing device 7 side, and therefore once registration is completed, validity of a user can be verified with the identification information thereafter. Accordingly, a user workload can be lightened with ensured security, and, by extension, the user can stably receive a service. Further, the previously generated identification information can be updated without performing complex processing and can be updated by modifying a portion of the random ID generated by the authentication apparatus 1; therefore, the identification information can be updated without executing modification processing on the information processing device 7 side. In addition, by registration of the random ID on the information processing device 7 side, the identification information can be regenerated without performing complex processing even if the user replaces the authentication apparatus 1 with a new one; as a result, the identification information can be preferably regenerated while lightening processing load compared to a case where the identification information generation processing is executed again.

MODIFIED EXAMPLES

The present disclosure is not limited to the aforementioned embodiment, and various modifications and applications can be made. For example, the authentication apparatus 1 and the information processing device 7 may not have every technical feature described in the aforementioned embodiment and may include part of the configuration described in the aforementioned embodiment in such a way as to solve at least one problem in the conventional technology. Further, at least part of the following modified examples may be combined.

Figure 16:
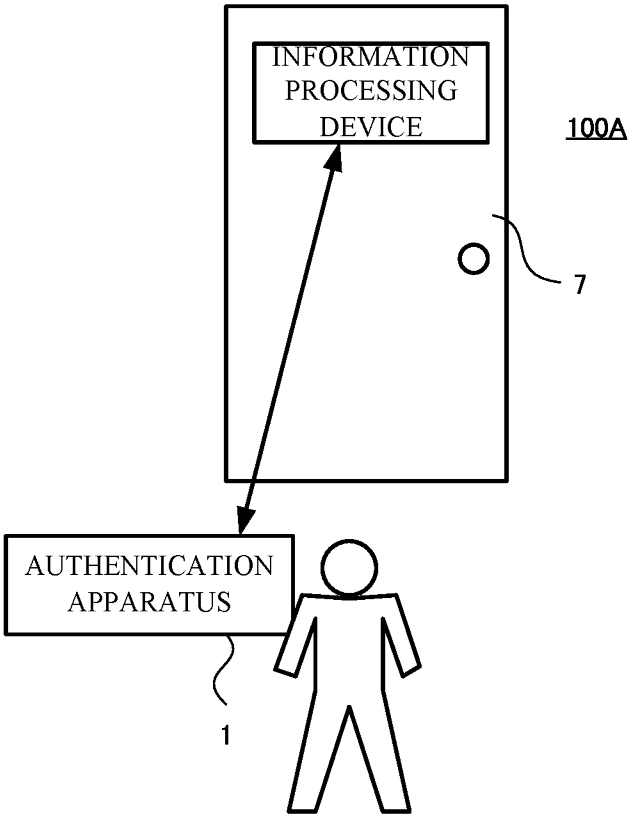
FIG. 16 is a diagram illustrating a configuration of an authentication system in a modified example.

While an example of the information processing device 7 being a personal computer, a smartphone, or a tablet terminal has been described in the aforementioned embodiment, the above is an example. Without being limited to the above, for example, the information processing device 7 may be a terminal installed on a door as is the case with an authentication system 100A illustrated in FIG. 16. In addition, for example, the information processing device 7 may be a terminal installed on a safe or a terminal installed on an automatic teller machine (ATM) installed in a financial institution or a convenience store. As illustrated in FIG. 16, when the information processing device 7 is installed on a door, the information processing device 7 permits entry of a user authenticated by the authentication apparatus 1 and therefore may determine validity of a target user using identification information and when the validity is verified, may unlock the door. In other words, processing of unlocking the door may be performed in the processing in Step S230 illustrated in FIG. 13B. When the information processing device 7 is installed in an ATM, the information processing device 7 may determine validity of a target user using the identification information and when the validity is verified, may enable a financial procedure.

Specifically, in the aforementioned embodiment, the authentication processing is started when an application for a financing service is run; however, when the information processing device 7 is installed on the door as illustrated in FIG. 16, the authentication processing is started when an application for unlocking the door is run and the authentication processing may be repeatedly executed in the background while the application is running (from when the application is started until when the application is ended).

The determination instruction processing may be also repeatedly executed for the same period. As described above, since the identification information generation processing is executed once for each provided service for a target user (or for each information processing device 7), one piece of identification information (identification information different from that for a financing service) is generated for a service of unlocking the door. Unlocking of the door illustrated in FIG. 16 includes unlocking of an admission gate to a venue for an event such as a concert. In the example illustrated in FIG. 16, an example in which a single information processing device 7 performs unlocking of a single door is described; however, the single information processing device may perform unlocking of a plurality of doors (including a plurality of admission gates). For example, when validity of the user is verified with the identification information, a key for unlocking the door (including the admission gate) may be transmitted from the information processing device 7 to the authentication apparatus 1.

Note that the authentication processing may be continuously and repeatedly executed in the background. The determination instruction processing may be started at a timing when an application for a service desired by the user is started.

In addition, the authentication system 100 is applicable to situations in which a service is provided by verifying validity of an individual user, such as facilities such as a concert and an event where only a ticket holder can enter, and certificates of an academic record and vaccination. In any situation, biometric information itself is not transmitted or received, and a plurality of pieces of identification information can be generated from the same biometric information (the same feature value of the face); and therefore a user workload can be lightened with ensured security and, by extension, the user can stably receive a service.

In the update processing according to the aforementioned embodiment, an example in which the processing is executed when a predetermined period such as half a year or a year elapses is described; however, the identification information may be newly generated when the update processing has been executed a preset number of times, for example, the identification information generation processing is executed to newly generate the identification information when the update processing has been executed three times and the identification information has been updated three times. In this manner, the identification information can be periodically generated using information that more accurately reflects the current state of the user in response to change in the biometric information over time. Therefore, when the authentication apparatus 1 is lost and the regeneration processing is executed, accuracy in generating the biometrical key in the same manner as before can be improved.

In the aforementioned embodiment, although an example of registering the identification information in the information processing device 7 (registering the identification information in the associated information list 771) in the processing in Step S218 illustrated in FIG. 13A is described, this is merely an example. The identification information does not have to be registered in the associated information list 771 as long as the public key of the authentication apparatus is registered in the associated information list 771. This is because the information processing device 7 can determine validity of the identification information by executing, in Step S222 illustrated in FIG. 13B, the processing in Steps S207A, S208A, and S212 to S214 illustrated in FIG. 13A without comparing the received identification information with the registered identification information. In addition, by registration of the public key of the authentication apparatus, the authentication apparatus 1 that is a recipient of the service can be identified. Note that the information to be registered in the associated information list 771 is not limited to the public key of the authentication apparatus; the information may be any information as long as the information can identify the authentication apparatus 1 that is a recipient of the service.

Each of the authentication apparatus 1 and the information processing device 7 may be implemented by using a common computer without depending on a dedicated device. For example, each of the authentication apparatus 1 and the information processing device 7 executing the aforementioned processing may be configured by installing a program for causing a computer to implement either of the aforementioned devices onto a computer from a non-transitory recording medium storing the program. Further, a single authentication apparatus 1 or information processing device 7 may be configured by cooperative operation of a plurality of computers.

Further, for example, when the aforementioned functions are implemented by sharing between an operating system (OS) and an application or by cooperation between an OS and an application, only a part other than the OS may be stored in the medium.

Further, a program may be superposed on a carrier wave and be delivered through a communication network. For example, the program may be posted on a bulletin board system (BBS) on a communication network, and the program may be delivered through the network. Then, the aforementioned processing may be executed by starting the program and executing the program similarly to other application programs under control of the operating system.

REFERENCE SIGNS LIST

1 Authentication apparatus
2 Internet
6 Camera
7 Information processing device
8 Server
9 Door
10, 70 Communicator
11, 71 Image capture device
11A Front-facing camera
11B Main camera
12, 72 Voice input-output device
12A Speaker
12B Microphone
13 Inclination detector
14, 73 Operation input device
15 Fingerprint detector
15A Left fingerprint sensor
15B Right fingerprint sensor
16 Position detector
17 AUTHENTICATION APPARATUS storage
18 AUTHENTICATION APPARATUS controller
19, 79 Display
21, 81 Processor
22, 82 Memory
23, 83 Display controller
24, 84 Display equipment
25, 85 I/O port
26, 86 Storage equipment
27, 87 Communication equipment
28, 88 Data bus
77 Information processing device storage
78 Information processing device controller
99 Financial institution
100, 100A, 100B Authentication system
170 Authentication processing program
171 Authentication biometric information database
172 Authentication behavior information database
173 Inclination information table
176 Identification information generation program
181 Authentication information acquirer
182 Authentication determiner
183, 783 Display processor
184 Authentication information updater
185, 785 Data transmitter-receiver
186 Identification information generator
187, 787 Processing device
770 Program
771 Associated information list
781 Determination information acquirer
782 Determiner

The invention claimed is:

1. An authentication apparatus comprising a processor, and a memory containing a program that, upon execution, performs steps comprising:

a biometric key generation step of, when a first condition is satisfied, generating a biometric key from biometric information of a user by applying a predetermined one-way function;

a public key acquisition step of acquiring an information processing device public key from an information processing device;

a pair key generation step of generating a pair key based on the biometric key and randomly generated information, the pair key including an authentication apparatus secret key and an authentication apparatus public key;

a common key generation step of generating a common key based on the authentication apparatus secret key generated in the pair key generation step and the information processing device public key acquired in the public key acquisition step;

an identification information generation step of generating, based on the randomly generated information and the common key generated in the common key generation step, identification information for verifying validity of the user;

a determination instruction step of transmitting, to the information processing device, the generated identification information generated in the identification information generation step and the authentication apparatus public key generated in the pair key generation step and instructing the information processing device to verify validity of the user based on the identification information and the authentication apparatus public key; and an updating step of, when a second condition that is different from the first condition is satisfied, updating contents of the identification information in such a way as to be different from contents of the identification information generated in the identification information generation step.

2. The authentication apparatus according to claim 1, wherein the first condition is satisfied when authentication of the user is successful based on biometric information of the user and behavior information of the user.

3. The authentication apparatus according to claim 1, wherein:

the common key generation step comprises generating the common key further based on a fixed part as the randomly generated information, the fixed part being a portion of the randomly generated information, and the updating step comprises modifying a variable part contained in the randomly generated information, the variable part being a portion of the randomly generated information other than the fixed part, and generating updated identification information based on the randomly generated information in which the variable part has been modified and the common key.

4. The authentication apparatus according to claim 3, wherein:

the public key acquisition step further comprises acquiring, from the information processing device, information containing the fixed part that is a portion of the randomly generated information, the common key generation step comprises generating the common key based on the fixed part acquired in the public key acquisition step, and the authentication apparatus is further configured to perform a regeneration step of regenerating the identification information based on the randomly generated information that is generated based on the fixed part acquired in the public key acquisition step and the common key generated in the common key generation step.

5. An authentication method executed by an authentication apparatus, the authentication method comprising:

a biometric key generation step of generating a biometric key, when a first condition is satisfied, from biometric information of a user by applying a predetermined one-way function;

a public key acquisition step of acquiring an information processing device public key from an information processing device;

a pair key generation step of generating a pair key based on the biometric key and randomly generated information, the pair key including an authentication apparatus secret key and an authentication apparatus public key;

a common key generation step of generating a common key based on the authentication apparatus secret key generated in the pair key generation step and the information processing device public key acquired in the public key acquisition step;

an identification information generation step of generating, based on the randomly generated information and the common key generated in the common key generation step, identification information for verifying validity of the user;

a determination instruction step of transmitting, to the information processing device, the identification information generated in the identification information generation step and the authentication apparatus public key generated in the pair key generation step and instructing the information processing device to verify validity of the user based on the identification information and the authentication apparatus public key; and an updating step of, when a second condition that is different from the first condition is satisfied, updating contents of the identification information in such a way as to be different from contents of the identification information generated in the identification information generation step.

6. An authentication system, comprising:

an authentication apparatus; and an information processing device configured to perform an information processing device pair key generation step of generating a pair key, the pair key including an information processing device public key and an information processing device secret key, the information processing device being configured to give an instruction to provide a service, wherein:

the authentication apparatus is configured to perform steps comprising:

a biometric key generation step of, when a first condition is satisfied, generating a biometric key from biometric information of a user by applying a predetermined one-way function;

a public key acquisition step of acquiring, from the information processing device, the information processing device public key generated in the information processing device pair key generation step;

an authentication apparatus pair key generation step of generating a pair key based on the biometric key and randomly generated information, the pair key including an authentication apparatus secret key and an authentication apparatus public key;

a common key generation step of generating a common key based on the authentication apparatus secret key generated in the authentication apparatus pair key generation step and the information processing device public key acquired in the public key acquisition step;

an identification information generation step of generating, based on the randomly generated information and the common key generated in the common key generation step, identification information for verifying validity of the user;

a determination instruction step of transmitting, to the information processing device, the identification information generated in the identification information generation step and the authentication apparatus public key generated in the authentication apparatus pair key generation step and instructing the information processing device to verify validity of the user; and an updating step of, when a second condition that is different from the first condition is satisfied, updating contents of the identification information in such a way as to be different from contents of the identification information generated in the identification information generation step, and the information processing device is further configured to perform steps comprising:

an identification information acquisition step of acquiring the identification information and the authentication apparatus public key transmitted in the determination instruction step;

a determination step of determining validity of the user based on the identification information and the authentication apparatus public key acquired in the identification information acquisition step; and a service provision instruction step of giving an instruction to provide a service for the user whose validity has been verified in the determination step.

7. The authentication system according to claim 6, wherein the identification information acquisition step comprises acquiring the identification information that has been updated in the updating step, and the determination step comprises determining validity of the user by applying processing that is common before and after updating the identification information in the updating step.

8. A non-transitory computer-readable recording medium storing a program, the program causing a computer to perform steps comprising:

a biometric key generation step of, when a first condition is satisfied, generating a biometric key from biometric information of a user by applying a predetermined one-way function;

a public key acquisition step of acquiring an information processing device public key from an information processing device;

a pair key generation step of generating a pair key based on the biometric key and randomly generated information, the pair key including an authentication apparatus secret key and an authentication apparatus public key;

a common key generation step of generating a common key based on the authentication apparatus secret key generated in the pair key generation step and the information processing device public key acquired in the public key acquisition step;

an identification information generation step of generating, based on the randomly generated information and the common key generated in the common key generation step, identification information for verifying validity of the user;

a determination instruction step of transmitting, to the information processing device, the identification information generated in the identification information generation step and the authentication apparatus public key generated in the pair key generation step and instructing the information processing device to verify validity of the user based on the identification information and the authentication apparatus public key; and an updating step of, when a second condition that is different from the first condition is satisfied, updating contents of the identification information in such a way as to be different from contents of the identification information generated in the identification information generation step.

* * * * *